United States Patent [19]
Tanaka et al.

[11] Patent Number: 5,598,290
[45] Date of Patent: Jan. 28, 1997

[54] DATA TRANSFER APPARATUS UTILIZING INFRARED RAYS

[75] Inventors: Junji Tanaka, Yamatokoriyama; Masanobu Watanabe, Ikoma-gun, both of Japan

[73] Assignee: Sharp Kabushiki Kaisha, Osaka, Japan

[21] Appl. No.: 260,455

[22] Filed: Jun. 14, 1994

[30] Foreign Application Priority Data

Jun. 30, 1993 [JP] Japan .................................. 5-162663

[51] Int. Cl.⁶ .................................................. H04B 10/04
[52] U.S. Cl. ........................ 359/180; 359/142; 359/172; 340/825.72; 415/151.2; 341/176
[58] Field of Search ..................................... 359/180, 181, 359/172, 158, 142, 146, 148, 140; 455/151.2; 348/734; 340/825.72, 825.5, 825.51; 375/309, 311; 341/178, 176; 370/108

[56] References Cited

U.S. PATENT DOCUMENTS 4,850,046  7/1989  Philippe .................................. 359/142
5,200,631  4/1993  Austin et al. .............................. 257/81

FOREIGN PATENT DOCUMENTS 4-243183  of 1992  Japan .
5-13843   of 1993  Japan .
5-211283  of 1993  Japan .

*Primary Examiner*—Wellington Chin
*Assistant Examiner*—Kinfe-Michael Negash
*Attorney, Agent, or Firm*—Nixon & Vanderhye P.C.

[57] ABSTRACT

A data transfer apparatus utilizing infrared rays characterized in that one transmission unit of transmission data formed by combining digital data comprising a bit row represented by two values "0" and "1" into a predetermined format is stored in a transmission buffer, transmission suspension time that should be added after the transmission of the one transmission unit of transmission data from an array of adjacent bit values that constitute the one transmission unit of transmission data is determined, and one transmission unit of transmission data is sent at an interval of the above transmission suspension time.

21 Claims, 20 Drawing Sheets

FIG. 4

| start bit START | data | | | | | | | | parity PR | stop bit STOP | adjacent correction coefficient | number of '1's | |
|---|---|---|---|---|---|---|---|---|---|---|---|---|---|
| | B0 | B1 | B2 | B3 | B4 | B5 | B6 | B7 | | | | | |
| 1 | 0 | 0 | 0 | 0 | 0 | 0 | 0 | 0 | 0 | 0 | 0 | 1 | |
| 1 | 1 | 0 | 0 | 0 | 0 | 0 | 0 | 0 | 1 | 0 | 0 | 3 | |
| 1 | 0 | 1 | 0 | 0 | 0 | 0 | 0 | 0 | 1 | 0 | 0 | 3 | |
| 1 | 1 | 1 | 0 | 0 | 0 | 0 | 0 | 0 | 0 | 0 | 0 | 3 | |
| 1 | 0 | 0 | 1 | 0 | 0 | 0 | 0 | 0 | 1 | 0 | 0 | 3 | |
| 1 | 1 | 0 | 1 | 0 | 0 | 0 | 0 | 0 | 0 | 0 | 0 | 3 | |
| 1 | 0 | 1 | 1 | 0 | 0 | 0 | 0 | 0 | 0 | 0 | 0 | 3 | |
| 1 | 1 | 1 | 1 | 0 | 0 | 0 | 0 | 0 | 1 | 0 | 0 | 5 | |
| 1 | 0 | 0 | 0 | 1 | 0 | 0 | 0 | 0 | 1 | 0 | 0 | 3 | |
| 1 | 1 | 0 | 0 | 1 | 0 | 0 | 0 | 0 | 0 | 0 | 0 | 3 | |
| 1 | 0 | 1 | 0 | 1 | 0 | 0 | 0 | 0 | 0 | 0 | 0 | 3 | |
| 1 | 1 | 1 | 0 | 1 | 0 | 0 | 0 | 0 | 1 | 0 | 0 | 5 | |
| 1 | 0 | 0 | 1 | 1 | 0 | 0 | 0 | 0 | 0 | 0 | 0 | 3 | |
| 1 | 1 | 0 | 1 | 1 | 0 | 0 | 0 | 0 | 1 | 0 | 0 | 5 | |
| 1 | 0 | 1 | 1 | 1 | 0 | 0 | 0 | 0 | 1 | 0 | 0 | 5 | |
| 1 | 1 | 1 | 1 | 1 | 0 | 0 | 0 | 0 | 0 | 0 | 0 | 5 | |
| 1 | 0 | 0 | 0 | 0 | 1 | 1 | 1 | 1 | 0 | 0 | 2 | 5 | ←A |
| 1 | 1 | 0 | 0 | 0 | 1 | 1 | 1 | 1 | 1 | 0 | 4 | 7 | ←B |
| 1 | 0 | 1 | 0 | 0 | 1 | 1 | 1 | 1 | 1 | 0 | 4 | 7 | |
| 1 | 1 | 1 | 0 | 0 | 1 | 1 | 1 | 1 | 0 | 0 | 3 | 7 | ←C |
| 1 | 0 | 0 | 1 | 0 | 1 | 1 | 1 | 1 | 1 | 0 | 4 | 7 | |
| 1 | 1 | 0 | 1 | 0 | 1 | 1 | 1 | 1 | 0 | 0 | 3 | 7 | |
| 1 | 0 | 1 | 1 | 0 | 1 | 1 | 1 | 1 | 0 | 0 | 3 | 7 | |
| 1 | 1 | 1 | 1 | 0 | 1 | 1 | 1 | 1 | 1 | 0 | 7 | 9 | |
| 1 | 0 | 0 | 0 | 1 | 1 | 1 | 1 | 1 | 1 | 0 | 5 | 7 | |
| 1 | 1 | 0 | 0 | 1 | 1 | 1 | 1 | 1 | 0 | 0 | 3 | 7 | |
| 1 | 0 | 1 | 0 | 1 | 1 | 1 | 1 | 1 | 0 | 0 | 3 | 7 | |
| 1 | 1 | 1 | 0 | 1 | 1 | 1 | 1 | 1 | 1 | 0 | 7 | 9 | |
| 1 | 0 | 0 | 1 | 1 | 1 | 1 | 1 | 1 | 0 | 0 | 4 | 7 | |
| 1 | 1 | 0 | 1 | 1 | 1 | 1 | 1 | 1 | 1 | 0 | 7 | 9 | |
| 1 | 0 | 1 | 1 | 1 | 1 | 1 | 1 | 1 | 1 | 0 | 7 | 9 | |
| 1 | 1 | 1 | 1 | 1 | 1 | 1 | 1 | 1 | 0 | 0 | 7 | 9 | |

FIG.14

| NO. | start bit START | data B0 | B1 | B2 | B3 | B4 | B5 | B6 | B7 | parity PR | stop bit STOP | adjacent correction coefficient | number of '1's' |
|---|---|---|---|---|---|---|---|---|---|---|---|---|---|
| 0 | 1 | 0 | 0 | 0 | 0 | 0 | 0 | 0 | 0 | 0 | 0 | 0 | 1 |
| 1 | 1 | 1 | 0 | 0 | 0 | 0 | 0 | 0 | 0 | 1 | 0 | 0 | 3 |
| 2 | 1 | 0 | 1 | 0 | 0 | 0 | 0 | 0 | 0 | 1 | 0 | 0 | 3 |
| 3 | 1 | 1 | 1 | 0 | 0 | 0 | 0 | 0 | 0 | 0 | 0 | 0 | 3 |
| 4 | 1 | 0 | 0 | 1 | 0 | 0 | 0 | 0 | 0 | 1 | 0 | 0 | 3 |
| 5 | 1 | 1 | 0 | 1 | 0 | 0 | 0 | 0 | 0 | 0 | 0 | 0 | 3 |
| 6 | 1 | 0 | 1 | 1 | 0 | 0 | 0 | 0 | 0 | 0 | 0 | 0 | 3 |
| 7 | 1 | 1 | 1 | 1 | 0 | 0 | 0 | 0 | 0 | 1 | 0 | 0 | 5 |
| 8 | 1 | 0 | 0 | 0 | 1 | 0 | 0 | 0 | 0 | 1 | 0 | 0 | 3 |
| 9 | 1 | 1 | 0 | 0 | 1 | 0 | 0 | 0 | 0 | 0 | 0 | 0 | 3 |
| 10 | 1 | 0 | 1 | 0 | 1 | 0 | 0 | 0 | 0 | 0 | 0 | 0 | 3 |
| 11 | 1 | 1 | 1 | 0 | 1 | 0 | 0 | 0 | 0 | 1 | 0 | 0 | 5 |
| 12 | 1 | 0 | 0 | 1 | 1 | 0 | 0 | 0 | 0 | 0 | 0 | 0 | 3 |
| 13 | 1 | 1 | 0 | 1 | 1 | 0 | 0 | 0 | 0 | 1 | 0 | 0 | 5 |
| 14 | 1 | 0 | 1 | 1 | 1 | 0 | 0 | 0 | 0 | 1 | 0 | 0 | 5 |
| 15 | 1 | 1 | 1 | 1 | 1 | 0 | 0 | 0 | 0 | 0 | 0 | 0 | 5 |
| 16 | 1 | 0 | 0 | 0 | 0 | 1 | 0 | 0 | 0 | 1 | 0 | 0 | 3 |
| 17 | 1 | 1 | 0 | 0 | 0 | 1 | 0 | 0 | 0 | 0 | 0 | 0 | 3 |
| 18 | 1 | 0 | 1 | 0 | 0 | 1 | 0 | 0 | 0 | 0 | 0 | 0 | 3 |
| 19 | 1 | 1 | 1 | 0 | 0 | 1 | 0 | 0 | 0 | 1 | 0 | 0 | 5 |
| 20 | 1 | 0 | 0 | 1 | 0 | 1 | 0 | 0 | 0 | 0 | 0 | 0 | 3 |
| 21 | 1 | 1 | 0 | 1 | 0 | 1 | 0 | 0 | 0 | 1 | 0 | 0 | 5 |
| 22 | 1 | 0 | 1 | 1 | 0 | 1 | 0 | 0 | 0 | 1 | 0 | 0 | 5 |
| 23 | 1 | 1 | 1 | 1 | 0 | 1 | 0 | 0 | 0 | 0 | 0 | 0 | 5 |
| 24 | 1 | 0 | 0 | 0 | 1 | 1 | 0 | 0 | 0 | 0 | 0 | 0 | 3 |
| 25 | 1 | 1 | 0 | 0 | 1 | 1 | 0 | 0 | 0 | 1 | 0 | 0 | 5 |
| 26 | 1 | 0 | 1 | 0 | 1 | 1 | 0 | 0 | 0 | 1 | 0 | 0 | 5 |
| 27 | 1 | 1 | 1 | 0 | 1 | 1 | 0 | 0 | 0 | 0 | 0 | 0 | 5 |
| 28 | 1 | 0 | 0 | 1 | 1 | 1 | 0 | 0 | 0 | 1 | 0 | 0 | 5 |
| 29 | 1 | 1 | 0 | 1 | 1 | 1 | 0 | 0 | 0 | 0 | 0 | 0 | 5 |
| 30 | 1 | 0 | 1 | 1 | 1 | 1 | 0 | 0 | 0 | 0 | 0 | 0 | 5 |
| 31 | 1 | 1 | 1 | 1 | 1 | 1 | 0 | 0 | 0 | 1 | 0 | 3 | 7 |

| NO. | start bit START | data | | | | | | | | parity PR | stop bit STOP | adjacent correction coefficient | number of '1's |
|---|---|---|---|---|---|---|---|---|---|---|---|---|---|
| | | B0 | B1 | B2 | B3 | B4 | B5 | B6 | B7 | | | | |
| 32 | 1 | 0 | 0 | 0 | 0 | 0 | 1 | 0 | 0 | 1 | 0 | 0 | 3 |
| 33 | 1 | 1 | 0 | 0 | 0 | 0 | 1 | 0 | 0 | 0 | 0 | 0 | 3 |
| 34 | 1 | 0 | 1 | 0 | 0 | 0 | 1 | 0 | 0 | 0 | 0 | 0 | 3 |
| 35 | 1 | 1 | 1 | 0 | 0 | 0 | 1 | 0 | 0 | 1 | 0 | 0 | 5 |
| 36 | 1 | 0 | 0 | 1 | 0 | 0 | 1 | 0 | 0 | 0 | 0 | 0 | 3 |
| 37 | 1 | 1 | 0 | 1 | 0 | 0 | 1 | 0 | 0 | 1 | 0 | 0 | 5 |
| 38 | 1 | 0 | 1 | 1 | 0 | 0 | 1 | 0 | 0 | 1 | 0 | 0 | 5 |
| 39 | 1 | 1 | 1 | 1 | 0 | 0 | 1 | 0 | 0 | 0 | 0 | 0 | 5 |
| 40 | 1 | 0 | 0 | 0 | 1 | 0 | 1 | 0 | 0 | 0 | 0 | 0 | 3 |
| 41 | 1 | 1 | 0 | 0 | 1 | 0 | 1 | 0 | 0 | 1 | 0 | 0 | 5 |
| 42 | 1 | 0 | 1 | 0 | 1 | 0 | 1 | 0 | 0 | 1 | 0 | 0 | 5 |
| 43 | 1 | 1 | 1 | 0 | 1 | 0 | 1 | 0 | 0 | 0 | 0 | 0 | 5 |
| 44 | 1 | 0 | 0 | 1 | 1 | 0 | 1 | 0 | 0 | 1 | 0 | 0 | 5 |
| 45 | 1 | 1 | 0 | 1 | 1 | 0 | 1 | 0 | 0 | 0 | 0 | 0 | 5 |
| 46 | 1 | 0 | 1 | 1 | 1 | 0 | 1 | 0 | 0 | 0 | 0 | 0 | 5 |
| 47 | 1 | 1 | 1 | 1 | 1 | 0 | 1 | 0 | 0 | 1 | 0 | 3 | 7 |
| 48 | 1 | 0 | 0 | 0 | 0 | 1 | 1 | 0 | 0 | 0 | 0 | 0 | 3 |
| 49 | 1 | 1 | 0 | 0 | 0 | 1 | 1 | 0 | 0 | 1 | 0 | 0 | 5 |
| 50 | 1 | 0 | 1 | 0 | 0 | 1 | 1 | 0 | 0 | 1 | 0 | 0 | 5 |
| 51 | 1 | 1 | 1 | 0 | 0 | 1 | 1 | 0 | 0 | 0 | 0 | 0 | 5 |
| 52 | 1 | 0 | 0 | 1 | 0 | 1 | 1 | 0 | 0 | 1 | 0 | 0 | 5 |
| 53 | 1 | 1 | 0 | 1 | 0 | 1 | 1 | 0 | 0 | 0 | 0 | 0 | 5 |
| 54 | 1 | 0 | 1 | 1 | 0 | 1 | 1 | 0 | 0 | 0 | 0 | 0 | 5 |
| 55 | 1 | 1 | 1 | 1 | 0 | 1 | 1 | 0 | 0 | 1 | 0 | 3 | 7 |
| 56 | 1 | 0 | 0 | 0 | 1 | 1 | 1 | 0 | 0 | 1 | 0 | 1 | 5 |
| 57 | 1 | 1 | 0 | 0 | 1 | 1 | 1 | 0 | 0 | 0 | 0 | 0 | 5 |
| 58 | 1 | 0 | 1 | 0 | 1 | 1 | 1 | 0 | 0 | 0 | 0 | 0 | 5 |
| 59 | 1 | 1 | 1 | 0 | 1 | 1 | 1 | 0 | 0 | 1 | 0 | 3 | 7 |
| 60 | 1 | 0 | 0 | 1 | 1 | 1 | 1 | 0 | 0 | 0 | 0 | 0 | 5 |
| 61 | 1 | 1 | 0 | 1 | 1 | 1 | 1 | 0 | 0 | 1 | 0 | 3 | 7 |
| 62 | 1 | 0 | 1 | 1 | 1 | 1 | 1 | 0 | 0 | 1 | 0 | 3 | 7 |
| 63 | 1 | 1 | 1 | 1 | 1 | 1 | 1 | 0 | 0 | 0 | 0 | 3 | 7 |

FIG.16

| NO. | start bit START | data | | | | | | | | parity PR | stop bit STOP | adjacent correction coefficient | number of '1's |
|---|---|---|---|---|---|---|---|---|---|---|---|---|---|
| | | B0 | B1 | B2 | B3 | B4 | B5 | B6 | B7 | | | | |
| 64 | 1 | 0 | 0 | 0 | 0 | 0 | 0 | 1 | 0 | 1 | 0 | 0 | 3 |
| 65 | 1 | 1 | 0 | 0 | 0 | 0 | 0 | 1 | 0 | 0 | 0 | 0 | 3 |
| 66 | 1 | 0 | 1 | 0 | 0 | 0 | 0 | 1 | 0 | 0 | 0 | 0 | 3 |
| 67 | 1 | 1 | 1 | 0 | 0 | 0 | 0 | 1 | 0 | 1 | 0 | 0 | 5 |
| 68 | 1 | 0 | 0 | 1 | 0 | 0 | 0 | 1 | 0 | 0 | 0 | 0 | 3 |
| 69 | 1 | 1 | 0 | 1 | 0 | 0 | 0 | 1 | 0 | 1 | 0 | 0 | 5 |
| 70 | 1 | 0 | 1 | 1 | 0 | 0 | 0 | 1 | 0 | 1 | 0 | 0 | 5 |
| 71 | 1 | 1 | 1 | 1 | 0 | 0 | 0 | 1 | 0 | 0 | 0 | 0 | 5 |
| 72 | 1 | 0 | 0 | 0 | 1 | 0 | 0 | 1 | 0 | 0 | 0 | 0 | 3 |
| 73 | 1 | 1 | 0 | 0 | 1 | 0 | 0 | 1 | 0 | 1 | 0 | 0 | 5 |
| 74 | 1 | 0 | 1 | 0 | 1 | 0 | 0 | 1 | 0 | 1 | 0 | 0 | 5 |
| 75 | 1 | 1 | 1 | 0 | 1 | 0 | 0 | 1 | 0 | 0 | 0 | 0 | 5 |
| 76 | 1 | 0 | 0 | 1 | 1 | 0 | 0 | 1 | 0 | 1 | 0 | 0 | 5 |
| 77 | 1 | 1 | 0 | 1 | 1 | 0 | 0 | 1 | 0 | 0 | 0 | 0 | 5 |
| 78 | 1 | 0 | 1 | 1 | 1 | 0 | 0 | 1 | 0 | 0 | 0 | 0 | 5 |
| 79 | 1 | 1 | 1 | 1 | 1 | 0 | 0 | 1 | 0 | 1 | 0 | 3 | 7 |
| 80 | 1 | 0 | 0 | 0 | 0 | 1 | 0 | 1 | 0 | 0 | 0 | 0 | 3 |
| 81 | 1 | 1 | 0 | 0 | 0 | 1 | 0 | 1 | 0 | 1 | 0 | 0 | 5 |
| 82 | 1 | 0 | 1 | 0 | 0 | 1 | 0 | 1 | 0 | 1 | 0 | 0 | 5 |
| 83 | 1 | 1 | 1 | 0 | 0 | 1 | 0 | 1 | 0 | 0 | 0 | 0 | 5 |
| 84 | 1 | 0 | 0 | 1 | 0 | 1 | 0 | 1 | 0 | 1 | 0 | 0 | 5 |
| 85 | 1 | 1 | 0 | 1 | 0 | 1 | 0 | 1 | 0 | 0 | 0 | 0 | 5 |
| 86 | 1 | 0 | 1 | 1 | 0 | 1 | 0 | 1 | 0 | 0 | 0 | 0 | 5 |
| 87 | 1 | 1 | 1 | 1 | 0 | 1 | 0 | 1 | 0 | 1 | 0 | 3 | 7 |
| 88 | 1 | 0 | 0 | 0 | 1 | 1 | 0 | 1 | 0 | 1 | 0 | 1 | 5 |
| 89 | 1 | 1 | 0 | 0 | 1 | 1 | 0 | 1 | 0 | 0 | 0 | 0 | 5 |
| 90 | 1 | 0 | 1 | 0 | 1 | 1 | 0 | 1 | 0 | 0 | 0 | 0 | 5 |
| 91 | 1 | 1 | 1 | 0 | 1 | 1 | 0 | 1 | 0 | 1 | 0 | 3 | 7 |
| 92 | 1 | 0 | 0 | 1 | 1 | 1 | 0 | 1 | 0 | 0 | 0 | 0 | 5 |
| 93 | 1 | 1 | 0 | 1 | 1 | 1 | 0 | 1 | 0 | 1 | 0 | 3 | 7 |
| 94 | 1 | 0 | 1 | 1 | 1 | 1 | 0 | 1 | 0 | 1 | 0 | 3 | 7 |
| 95 | 1 | 1 | 1 | 1 | 1 | 1 | 0 | 1 | 0 | 0 | 0 | 3 | 7 |

| NO. | start bit START | data B0 | B1 | B2 | B3 | B4 | B5 | B6 | B7 | parity PR | stop bit STOP | adjacent correction coefficient | number of '1's |
|---|---|---|---|---|---|---|---|---|---|---|---|---|---|
| 96  | 1 | 0 | 0 | 0 | 0 | 0 | 1 | 1 | 0 | 0 | 0 | 0 | 3 |
| 97  | 1 | 1 | 0 | 0 | 0 | 0 | 1 | 1 | 0 | 1 | 0 | 1 | 5 |
| 98  | 1 | 0 | 1 | 0 | 0 | 0 | 1 | 1 | 0 | 1 | 0 | 1 | 5 |
| 99  | 1 | 1 | 1 | 0 | 0 | 0 | 1 | 1 | 0 | 0 | 0 | 0 | 5 |
| 100 | 1 | 0 | 0 | 1 | 0 | 0 | 1 | 1 | 0 | 1 | 0 | 1 | 5 |
| 101 | 1 | 1 | 0 | 1 | 0 | 0 | 1 | 1 | 0 | 0 | 0 | 0 | 5 |
| 102 | 1 | 0 | 1 | 1 | 0 | 0 | 1 | 1 | 0 | 0 | 0 | 0 | 5 |
| 103 | 1 | 1 | 1 | 1 | 0 | 0 | 1 | 1 | 0 | 1 | 0 | 3 | 7 |
| 104 | 1 | 0 | 0 | 0 | 1 | 0 | 1 | 1 | 0 | 1 | 0 | 1 | 5 |
| 105 | 1 | 1 | 0 | 0 | 1 | 0 | 1 | 1 | 0 | 0 | 0 | 0 | 5 |
| 106 | 1 | 0 | 1 | 0 | 1 | 0 | 1 | 1 | 0 | 0 | 0 | 0 | 5 |
| 107 | 1 | 1 | 1 | 0 | 1 | 0 | 1 | 1 | 0 | 1 | 0 | 3 | 7 |
| 108 | 1 | 0 | 0 | 1 | 1 | 0 | 1 | 1 | 0 | 0 | 0 | 0 | 5 |
| 109 | 1 | 1 | 0 | 1 | 1 | 0 | 1 | 1 | 0 | 1 | 0 | 3 | 7 |
| 110 | 1 | 0 | 1 | 1 | 1 | 0 | 1 | 1 | 0 | 1 | 0 | 3 | 7 |
| 111 | 1 | 1 | 1 | 1 | 1 | 0 | 1 | 1 | 0 | 0 | 0 | 3 | 7 |
| 112 | 1 | 0 | 0 | 0 | 0 | 1 | 1 | 1 | 0 | 1 | 0 | 2 | 5 |
| 113 | 1 | 1 | 0 | 0 | 0 | 1 | 1 | 1 | 0 | 0 | 0 | 0 | 5 |
| 114 | 1 | 0 | 1 | 0 | 0 | 1 | 1 | 1 | 0 | 0 | 0 | 0 | 5 |
| 115 | 1 | 1 | 1 | 0 | 0 | 1 | 1 | 1 | 0 | 1 | 0 | 3 | 7 |
| 116 | 1 | 0 | 0 | 1 | 0 | 1 | 1 | 1 | 0 | 0 | 0 | 0 | 5 |
| 117 | 1 | 1 | 0 | 1 | 0 | 1 | 1 | 1 | 0 | 1 | 0 | 3 | 7 |
| 118 | 1 | 0 | 1 | 1 | 0 | 1 | 1 | 1 | 0 | 1 | 0 | 3 | 7 |
| 119 | 1 | 1 | 1 | 1 | 0 | 1 | 1 | 1 | 0 | 0 | 0 | 3 | 7 |
| 120 | 1 | 0 | 0 | 0 | 1 | 1 | 1 | 1 | 0 | 0 | 0 | 1 | 5 |
| 121 | 1 | 1 | 0 | 0 | 1 | 1 | 1 | 1 | 0 | 1 | 0 | 3 | 7 |
| 122 | 1 | 0 | 1 | 0 | 1 | 1 | 1 | 1 | 0 | 1 | 0 | 3 | 7 |
| 123 | 1 | 1 | 1 | 0 | 1 | 1 | 1 | 1 | 0 | 0 | 0 | 3 | 7 |
| 124 | 1 | 0 | 0 | 1 | 1 | 1 | 1 | 1 | 0 | 1 | 0 | 4 | 7 |
| 125 | 1 | 1 | 0 | 1 | 1 | 1 | 1 | 1 | 0 | 0 | 0 | 3 | 7 |
| 126 | 1 | 0 | 1 | 1 | 1 | 1 | 1 | 1 | 0 | 0 | 0 | 3 | 7 |
| 127 | 1 | 1 | 1 | 1 | 1 | 1 | 1 | 1 | 0 | 1 | 0 | 7 | 9 |

| NO. | start bit START | data B0 | B1 | B2 | B3 | B4 | B5 | B6 | B7 | parity PR | stop bit STOP | adjacent correction coefficient | number of '1's' |
|---|---|---|---|---|---|---|---|---|---|---|---|---|---|
| 128 | 1 | 0 | 0 | 0 | 0 | 0 | 0 | 0 | 1 | 1 | 0 | 1 | 3 |
| 129 | 1 | 1 | 0 | 0 | 0 | 0 | 0 | 0 | 1 | 0 | 0 | 0 | 3 |
| 130 | 1 | 0 | 1 | 0 | 0 | 0 | 0 | 0 | 1 | 0 | 0 | 0 | 3 |
| 131 | 1 | 1 | 1 | 0 | 0 | 0 | 0 | 0 | 1 | 1 | 0 | 1 | 5 |
| 132 | 1 | 0 | 0 | 1 | 0 | 0 | 0 | 0 | 1 | 0 | 0 | 0 | 3 |
| 133 | 1 | 1 | 0 | 1 | 0 | 0 | 0 | 0 | 1 | 1 | 0 | 1 | 5 |
| 134 | 1 | 0 | 1 | 1 | 0 | 0 | 0 | 0 | 1 | 1 | 0 | 1 | 5 |
| 135 | 1 | 1 | 1 | 1 | 0 | 0 | 0 | 0 | 1 | 0 | 0 | 0 | 5 |
| 136 | 1 | 0 | 0 | 0 | 1 | 0 | 0 | 0 | 1 | 0 | 0 | 0 | 3 |
| 137 | 1 | 1 | 0 | 0 | 1 | 0 | 0 | 0 | 1 | 1 | 0 | 1 | 5 |
| 138 | 1 | 0 | 1 | 0 | 1 | 0 | 0 | 0 | 1 | 1 | 0 | 1 | 5 |
| 139 | 1 | 1 | 1 | 0 | 1 | 0 | 0 | 0 | 1 | 0 | 0 | 0 | 5 |
| 140 | 1 | 0 | 0 | 1 | 1 | 0 | 0 | 0 | 1 | 1 | 0 | 1 | 5 |
| 141 | 1 | 1 | 0 | 1 | 1 | 0 | 0 | 0 | 1 | 0 | 0 | 0 | 5 |
| 142 | 1 | 0 | 1 | 1 | 1 | 0 | 0 | 0 | 1 | 0 | 0 | 0 | 5 |
| 143 | 1 | 1 | 1 | 1 | 1 | 0 | 0 | 0 | 1 | 1 | 0 | 3 | 7 |
| 144 | 1 | 0 | 0 | 0 | 0 | 1 | 0 | 0 | 1 | 0 | 0 | 0 | 3 |
| 145 | 1 | 1 | 0 | 0 | 0 | 1 | 0 | 0 | 1 | 1 | 0 | 1 | 5 |
| 146 | 1 | 0 | 1 | 0 | 0 | 1 | 0 | 0 | 1 | 1 | 0 | 1 | 5 |
| 147 | 1 | 1 | 1 | 0 | 0 | 1 | 0 | 0 | 1 | 0 | 0 | 0 | 5 |
| 148 | 1 | 0 | 0 | 1 | 0 | 1 | 0 | 0 | 1 | 1 | 0 | 1 | 5 |
| 149 | 1 | 1 | 0 | 1 | 0 | 1 | 0 | 0 | 1 | 0 | 0 | 0 | 5 |
| 150 | 1 | 0 | 1 | 1 | 0 | 1 | 0 | 0 | 1 | 0 | 0 | 0 | 5 |
| 151 | 1 | 1 | 1 | 1 | 0 | 1 | 0 | 0 | 1 | 1 | 0 | 3 | 7 |
| 152 | 1 | 0 | 0 | 0 | 1 | 1 | 0 | 0 | 1 | 1 | 0 | 1 | 5 |
| 153 | 1 | 1 | 0 | 0 | 1 | 1 | 0 | 0 | 1 | 0 | 0 | 0 | 5 |
| 154 | 1 | 0 | 1 | 0 | 1 | 1 | 0 | 0 | 1 | 0 | 0 | 0 | 5 |
| 155 | 1 | 1 | 1 | 0 | 1 | 1 | 0 | 0 | 1 | 1 | 0 | 3 | 7 |
| 156 | 1 | 0 | 0 | 1 | 1 | 1 | 0 | 0 | 1 | 0 | 0 | 0 | 5 |
| 157 | 1 | 1 | 0 | 1 | 1 | 1 | 0 | 0 | 1 | 1 | 0 | 3 | 7 |
| 158 | 1 | 0 | 1 | 1 | 1 | 1 | 0 | 0 | 1 | 1 | 0 | 3 | 7 |
| 159 | 1 | 1 | 1 | 1 | 1 | 1 | 0 | 0 | 1 | 0 | 0 | 3 | 7 |

| NO. | start bit START | data B0 | B1 | B2 | B3 | B4 | B5 | B6 | B7 | parity PR | stop bit STOP | adjacent correction coefficient | number of '1's' |
|---|---|---|---|---|---|---|---|---|---|---|---|---|---|
| 160 | 1 | 0 | 0 | 0 | 0 | 0 | 1 | 0 | 1 | 0 | 0 | 0 | 3 |
| 161 | 1 | 1 | 0 | 0 | 0 | 0 | 1 | 0 | 1 | 1 | 0 | 1 | 5 |
| 162 | 1 | 0 | 1 | 0 | 0 | 0 | 1 | 0 | 1 | 1 | 0 | 1 | 5 |
| 163 | 1 | 1 | 1 | 0 | 0 | 0 | 1 | 0 | 1 | 0 | 0 | 0 | 5 |
| 164 | 1 | 0 | 0 | 1 | 0 | 0 | 1 | 0 | 1 | 1 | 0 | 1 | 5 |
| 165 | 1 | 1 | 0 | 1 | 0 | 0 | 1 | 0 | 1 | 0 | 0 | 0 | 5 |
| 166 | 1 | 0 | 1 | 1 | 0 | 0 | 1 | 0 | 1 | 0 | 0 | 0 | 5 |
| 167 | 1 | 1 | 1 | 1 | 0 | 0 | 1 | 0 | 1 | 1 | 0 | 3 | 7 |
| 168 | 1 | 0 | 0 | 0 | 1 | 0 | 1 | 0 | 1 | 1 | 0 | 1 | 5 |
| 169 | 1 | 1 | 0 | 0 | 1 | 0 | 1 | 0 | 1 | 0 | 0 | 0 | 5 |
| 170 | 1 | 0 | 1 | 0 | 1 | 0 | 1 | 0 | 1 | 0 | 0 | 0 | 5 |
| 171 | 1 | 1 | 1 | 0 | 1 | 0 | 1 | 0 | 1 | 1 | 0 | 3 | 7 |
| 172 | 1 | 0 | 0 | 1 | 1 | 0 | 1 | 0 | 1 | 0 | 0 | 0 | 5 |
| 173 | 1 | 1 | 0 | 1 | 1 | 0 | 1 | 0 | 1 | 1 | 0 | 3 | 7 |
| 174 | 1 | 0 | 1 | 1 | 1 | 0 | 1 | 0 | 1 | 1 | 0 | 3 | 7 |
| 175 | 1 | 1 | 1 | 1 | 1 | 0 | 1 | 0 | 1 | 0 | 0 | 3 | 7 |
| 176 | 1 | 0 | 0 | 0 | 0 | 1 | 1 | 0 | 1 | 1 | 0 | 2 | 5 |
| 177 | 1 | 1 | 0 | 0 | 0 | 1 | 1 | 0 | 1 | 0 | 0 | 0 | 5 |
| 178 | 1 | 0 | 1 | 0 | 0 | 1 | 1 | 0 | 1 | 0 | 0 | 0 | 5 |
| 179 | 1 | 1 | 1 | 0 | 0 | 1 | 1 | 0 | 1 | 1 | 0 | 3 | 7 |
| 180 | 1 | 0 | 0 | 1 | 0 | 1 | 1 | 0 | 1 | 0 | 0 | 0 | 5 |
| 181 | 1 | 1 | 0 | 1 | 0 | 1 | 1 | 0 | 1 | 1 | 0 | 3 | 7 |
| 182 | 1 | 0 | 1 | 1 | 0 | 1 | 1 | 0 | 1 | 1 | 0 | 3 | 7 |
| 183 | 1 | 1 | 1 | 1 | 0 | 1 | 1 | 0 | 1 | 0 | 0 | 3 | 7 |
| 184 | 1 | 0 | 0 | 0 | 1 | 1 | 1 | 0 | 1 | 0 | 0 | 1 | 5 |
| 185 | 1 | 1 | 0 | 0 | 1 | 1 | 1 | 0 | 1 | 1 | 0 | 3 | 7 |
| 186 | 1 | 0 | 1 | 0 | 1 | 1 | 1 | 0 | 1 | 1 | 0 | 3 | 7 |
| 187 | 1 | 1 | 1 | 0 | 1 | 1 | 1 | 0 | 1 | 0 | 0 | 3 | 7 |
| 188 | 1 | 0 | 0 | 1 | 1 | 1 | 1 | 0 | 1 | 1 | 0 | 4 | 7 |
| 189 | 1 | 1 | 0 | 1 | 1 | 1 | 1 | 0 | 1 | 0 | 0 | 3 | 7 |
| 190 | 1 | 0 | 1 | 1 | 1 | 1 | 1 | 0 | 1 | 0 | 0 | 3 | 7 |
| 191 | 1 | 1 | 1 | 1 | 1 | 1 | 1 | 0 | 1 | 1 | 0 | 7 | 9 |

| NO. | start bit START | data B0 | B1 | B2 | B3 | B4 | B5 | B6 | B7 | parity PR | stop bit STOP | adjacent correction coefficient | number of '1's |
|---|---|---|---|---|---|---|---|---|---|---|---|---|---|
| 192 | 1 | 0 | 0 | 0 | 0 | 0 | 0 | 1 | 1 | 0 | 0 | 0 | 3 |
| 193 | 1 | 1 | 0 | 0 | 0 | 0 | 0 | 1 | 1 | 1 | 0 | 2 | 5 |
| 194 | 1 | 0 | 1 | 0 | 0 | 0 | 0 | 1 | 1 | 1 | 0 | 2 | 5 |
| 195 | 1 | 1 | 1 | 0 | 0 | 0 | 0 | 1 | 1 | 0 | 0 | 0 | 5 |
| 196 | 1 | 0 | 0 | 1 | 0 | 0 | 0 | 1 | 1 | 1 | 0 | 2 | 5 |
| 197 | 1 | 1 | 0 | 1 | 0 | 0 | 0 | 1 | 1 | 0 | 0 | 0 | 5 |
| 198 | 1 | 0 | 1 | 1 | 0 | 0 | 0 | 1 | 1 | 0 | 0 | 0 | 5 |
| 199 | 1 | 1 | 1 | 1 | 0 | 0 | 0 | 1 | 1 | 1 | 0 | 3 | 7 |
| 200 | 1 | 0 | 0 | 0 | 1 | 0 | 0 | 1 | 1 | 1 | 0 | 2 | 5 |
| 201 | 1 | 1 | 0 | 0 | 1 | 0 | 0 | 1 | 1 | 0 | 0 | 0 | 5 |
| 202 | 1 | 0 | 1 | 0 | 1 | 0 | 0 | 1 | 1 | 0 | 0 | 0 | 5 |
| 203 | 1 | 1 | 1 | 0 | 1 | 0 | 0 | 1 | 1 | 1 | 0 | 3 | 7 |
| 204 | 1 | 0 | 0 | 1 | 1 | 0 | 0 | 1 | 1 | 0 | 0 | 0 | 5 |
| 205 | 1 | 1 | 0 | 1 | 1 | 0 | 0 | 1 | 1 | 1 | 0 | 3 | 7 |
| 206 | 1 | 0 | 1 | 1 | 1 | 0 | 0 | 1 | 1 | 1 | 0 | 3 | 7 |
| 207 | 1 | 1 | 1 | 1 | 1 | 0 | 0 | 1 | 1 | 0 | 0 | 3 | 7 |
| 208 | 1 | 0 | 0 | 0 | 0 | 1 | 0 | 1 | 1 | 1 | 0 | 2 | 5 |
| 209 | 1 | 1 | 0 | 0 | 0 | 1 | 0 | 1 | 1 | 0 | 0 | 0 | 5 |
| 210 | 1 | 0 | 1 | 0 | 0 | 1 | 0 | 1 | 1 | 0 | 0 | 0 | 5 |
| 211 | 1 | 1 | 1 | 0 | 0 | 1 | 0 | 1 | 1 | 1 | 0 | 3 | 7 |
| 212 | 1 | 0 | 0 | 1 | 0 | 1 | 0 | 1 | 1 | 0 | 0 | 0 | 5 |
| 213 | 1 | 1 | 0 | 1 | 0 | 1 | 0 | 1 | 1 | 1 | 0 | 3 | 7 |
| 214 | 1 | 0 | 1 | 1 | 0 | 1 | 0 | 1 | 1 | 1 | 0 | 3 | 7 |
| 215 | 1 | 1 | 1 | 1 | 0 | 1 | 0 | 1 | 1 | 0 | 0 | 3 | 7 |
| 216 | 1 | 0 | 0 | 0 | 1 | 1 | 0 | 1 | 1 | 0 | 0 | 1 | 5 |
| 217 | 1 | 1 | 0 | 0 | 1 | 1 | 0 | 1 | 1 | 1 | 0 | 3 | 7 |
| 218 | 1 | 0 | 1 | 0 | 1 | 1 | 0 | 1 | 1 | 1 | 0 | 3 | 7 |
| 219 | 1 | 1 | 1 | 0 | 1 | 1 | 0 | 1 | 1 | 0 | 0 | 3 | 7 |
| 220 | 1 | 0 | 0 | 1 | 1 | 1 | 0 | 1 | 1 | 1 | 0 | 4 | 7 |
| 221 | 1 | 1 | 0 | 1 | 1 | 1 | 0 | 1 | 1 | 0 | 0 | 3 | 7 |
| 222 | 1 | 0 | 1 | 1 | 1 | 1 | 0 | 1 | 1 | 0 | 0 | 3 | 7 |
| 223 | 1 | 1 | 1 | 1 | 1 | 1 | 0 | 1 | 1 | 1 | 0 | 7 | 9 |

| NO. | start bit START | data B0 | B1 | B2 | B3 | B4 | B5 | B6 | B7 | parity PR | stop bit STOP | adjacent correction coefficient | number of '1's |
|---|---|---|---|---|---|---|---|---|---|---|---|---|---|
| 224 | 1 | 0 | 0 | 0 | 0 | 0 | 1 | 1 | 1 | 1 | 0 | 3 | 5 |
| 225 | 1 | 1 | 0 | 0 | 0 | 0 | 1 | 1 | 1 | 0 | 0 | 1 | 5 |
| 226 | 1 | 0 | 1 | 0 | 0 | 0 | 1 | 1 | 1 | 0 | 0 | 1 | 5 |
| 227 | 1 | 1 | 1 | 0 | 0 | 0 | 1 | 1 | 1 | 1 | 0 | 3 | 7 |
| 228 | 1 | 0 | 0 | 1 | 0 | 0 | 1 | 1 | 1 | 0 | 0 | 1 | 5 |
| 229 | 1 | 1 | 0 | 1 | 0 | 0 | 1 | 1 | 1 | 1 | 0 | 3 | 7 |
| 230 | 1 | 0 | 1 | 1 | 0 | 0 | 1 | 1 | 1 | 1 | 0 | 3 | 7 |
| 231 | 1 | 1 | 1 | 1 | 0 | 0 | 1 | 1 | 1 | 0 | 0 | 3 | 7 |
| 232 | 1 | 0 | 0 | 0 | 1 | 0 | 1 | 1 | 1 | 0 | 0 | 1 | 5 |
| 233 | 1 | 1 | 0 | 0 | 1 | 0 | 1 | 1 | 1 | 1 | 0 | 3 | 7 |
| 234 | 1 | 0 | 1 | 0 | 1 | 0 | 1 | 1 | 1 | 1 | 0 | 3 | 7 |
| 235 | 1 | 1 | 1 | 0 | 1 | 0 | 1 | 1 | 1 | 0 | 0 | 3 | 7 |
| 236 | 1 | 0 | 0 | 1 | 1 | 0 | 1 | 1 | 1 | 1 | 0 | 4 | 7 |
| 237 | 1 | 1 | 0 | 1 | 1 | 0 | 1 | 1 | 1 | 0 | 0 | 3 | 7 |
| 238 | 1 | 0 | 1 | 1 | 1 | 0 | 1 | 1 | 1 | 0 | 0 | 3 | 7 |
| 239 | 1 | 1 | 1 | 1 | 1 | 0 | 1 | 1 | 1 | 1 | 0 | 7 | 9 |
| 240 | 1 | 0 | 0 | 0 | 0 | 1 | 1 | 1 | 1 | 0 | 0 | 2 | 5 |
| 241 | 1 | 1 | 0 | 0 | 0 | 1 | 1 | 1 | 1 | 1 | 0 | 4 | 7 |
| 242 | 1 | 0 | 1 | 0 | 0 | 1 | 1 | 1 | 1 | 1 | 0 | 4 | 7 |
| 243 | 1 | 1 | 1 | 0 | 0 | 1 | 1 | 1 | 1 | 0 | 0 | 3 | 7 |
| 244 | 1 | 0 | 0 | 1 | 0 | 1 | 1 | 1 | 1 | 1 | 0 | 4 | 7 |
| 245 | 1 | 1 | 0 | 1 | 0 | 1 | 1 | 1 | 1 | 0 | 0 | 3 | 7 |
| 246 | 1 | 0 | 1 | 1 | 0 | 1 | 1 | 1 | 1 | 0 | 0 | 3 | 7 |
| 247 | 1 | 1 | 1 | 1 | 0 | 1 | 1 | 1 | 1 | 1 | 0 | 7 | 9 |
| 248 | 1 | 0 | 0 | 0 | 1 | 1 | 1 | 1 | 1 | 1 | 0 | 5 | 7 |
| 249 | 1 | 1 | 0 | 0 | 1 | 1 | 1 | 1 | 1 | 0 | 0 | 3 | 7 |
| 250 | 1 | 0 | 1 | 0 | 1 | 1 | 1 | 1 | 1 | 0 | 0 | 3 | 7 |
| 251 | 1 | 1 | 1 | 0 | 1 | 1 | 1 | 1 | 1 | 1 | 0 | 7 | 9 |
| 252 | 1 | 0 | 0 | 1 | 1 | 1 | 1 | 1 | 1 | 0 | 0 | 4 | 7 |
| 253 | 1 | 1 | 0 | 1 | 1 | 1 | 1 | 1 | 1 | 1 | 0 | 7 | 9 |
| 254 | 1 | 0 | 1 | 1 | 1 | 1 | 1 | 1 | 1 | 1 | 0 | 7 | 9 |
| 255 | 1 | 1 | 1 | 1 | 1 | 1 | 1 | 1 | 1 | 0 | 0 | 7 | 9 |

118

DATA TRANSFER APPARATUS UTILIZING INFRARED RAYS

BACKGROUND OF THE INVENTION

1. Field of the Invention

The present invention relates to data transfer apparatus utilizing infrared rays, and more particularly to a data transfer apparatus for sending a large quantity of data by utilizing a base band mode of infrared rays based on amplitude shift keying (ASK).

2. Description of the Related Art

In recent years, communication apparatus such as cordless telephones, mobile communication terminals and wireless remote control devices have become prevalent in our daily life. In addition, the realization of wireless LAN has been promoted, and wireless communication is getting more and more important than ever before.

As one mode of relatively short distance wireless communication, attention has been directed to a data transmission mode utilizing an ASK-based base band mode of infrared rays.

Normally, this particular data transmission mode sends data in bytes by using an asynchronous method.

As shown in FIG. 10, one transmission unit of transmission data to be sent is represented by a start bit "1," 8-bit long transmission data (B0 to B7), a parity bit and a stop bit "0". In other words, the transmission data is represented by 11 bits in total.

Data transmission using infrared rays means data transmission by the blinking of LED's that emit infrared rays.

Specifically, infrared rays emitting LED's are blinked with a signal that has been modulated with a sub-carrier wave frequency for a predetermined time when the data bit assumes "1". When the signal is to be modulated with 500 KHz sub-carrier wave, LED's repeat 0.5 million blinkings for continuous transmission of "1" for one second. When the data bit assumes "0", LED's are quenched for a predetermined time.

On the receiving side of the data transmission, infrared rays are received with a receptor such as photo-diodes, photo-transistors or the like. Then transmission data is demodulated by letting the data to pass through amplifiers, filters and demodulation circuits.

In addition, to secure the transmission quality of communication and to continuously send a large quality of data on the order of several tens of Kbyte, data is actually sent in accordance with communication circuit control procedures such as the basic procedures or HDLC procedures for performing error detection and retransmission.

As described above, in a data transmission mode in which infrared rays emitting LED's is blinked for sending data "1", the LED blinking time is extremely prolonged as shown in FIG. 11 when FFH data is sent. In such case, heat radiation of LED's becomes very large and the deterioration in the performance of data transmission is quickened.

The deterioration in the performance in data transmission owing to heat radiated from LED's will lead to the shortage in luminescent power from LED's and delay in the luminescence. This will affect the time properties of LED blinking. In the end, the quality of communication is deteriorated such that light cannot be received at the receiving side of data transmission.

Therefore, the following methods have been considered to inhibit heat radiation of LED's.

1) To minimize the continuous transfer of "1", time is set for suspending data transmission for a predetermined time, for example 10 msec immediately after data has been sent for a predetermined time, for example, 1000 msec.

2) A predetermined time is set for suspending data transmission immediately after one transmission unit of transmission data has been sent. For example, as shown in FIG. 12, 5-bit compulsory suspension time is set immediately after the stop bit has been sent.

3) As shown in FIG. 13, data is sent with RZ (return to zero) mode having both blinking and quenching period of LED per one bit.

In all the three methods described above, time is taken for suspending data transmission for quenching LED's in a concentrating or scattering manner to cool LED's.

All the above methods have a drawback of slowing the communication speed without exception though such methods serve to moderate heat radiation of LED's and prolonging the life of LED's by setting a time for cooling LED's. In addition, the RZ mode has a smaller blinkings of LED's per one bit. The reliability of data transmission is a problem in communication in an environment in which various troubles are likely to be generated in data transmission through space.

Although data transfer speed per byte is made faster than wire transmission speed by utilizing infrared rays, there is a fear that an originally intended high speed communication cannot be performed by setting suspension time for inhibiting heat radiation from LED's.

In addition, deterioration in the communication reliability results in a frequent retransmission of data by means of communication control procedures, which slows down the communication speed.

As light emitting devices used for preventing the deterioration in the performance owing to heat, the following related inventions are available.

Japanese Published Unexamined Patent Application No. HEI 4-243183 laid open on Aug. 31, 1992 describes a semiconductor laser apparatus providing a construction comprising a photoconductive channel layer and a clad layer both formed of a mixed crystal having a difference dimension, the photo-conductive channel layer having a distribution feedback portion formed thereon whereby a single mode of laser light can be stable oscillated.

Furthermore, Japanese Published Unexamined Patent Application No. HEI 5-13843 laid open on Jan. 22, 1993 describes a heat radiation component comprising a stem having a portion on which a semiconductor element is mounted, a gas phase synthesis polycrystalline diamond layer covering the surface of the portion of the stem where the semiconductor is mounted, whereby heat conduction efficiency from the semiconductor laser element is improved and the deterioration of properties owing to heat generation at the semiconductor laser element can be prevented.

Furthermore, Japanese Published Unexamined Patent Application No. HEI 5-211283 laid open on Aug. 20, 1993 describes an optoelectronics package for optical communication between a light transmitter and a light receiver arranged on different substrates without using an optical fiber or a photoconductive channel.

SUMMARY OF THE INVENTION

The present invention provides a data transfer apparatus utilizing infrared rays comprising:

transmission data generating means for generating one transmission unit of transmission data;

transmission buffer for storing the one transmission unit of the transmission data, produced by the transmission data generating means;

data transfer means for modulating and transferring each of the transmission data in the one transmission unit into a space by utilizing an infrared ray emitting LED, each of the transmission data being stored in the transmission buffer; and transmission suspending means for determining a transmission suspension time to be added after sending the one transmission unit of the transmission data from an array of adjacent bit values constituting the one transmission unit of the transmission data to be sent;

the data transfer means sending the one transmission unit of the transmission data at an interval of the transmission suspension time produced by the transmission suspending means.

Furthermore, the present invention provides a data transfer apparatus utilizing infrared rays comprising:

transmission data generating means for generating one transmission unit of transmission data by combining digital data comprising a bit row represented by two values "0" and "1" into a predetermined format;

transmission buffer for storing the one transmission unit of the transmission data;

data transfer means for modulating and transferring each one transmission data in the one transmission unit into a space by utilizing an infrared ray emitting LED, each one transmission data being stored in the transmission buffer; and transmission suspending means for generating transmission suspension time that should be added after the one transmission unit of the transmission data has been sent in a case where the cumulative number of bit values of "1" or "0" that have been sent exceeds a predetermined number;

the data transfer means sending the one transmission unit of the transmission data at an interval of the transmission suspension time produced by the transmission suspending means only in a case where the cumulative number exceeds the predetermined number.

In accordance with the present invention, the transmission suspension time is set which corresponds to a bit row constituting the one transmission unit of the transmission data, or the time corresponding to an LED emission suspension time. This prevents the deterioration in the quality of communication resulting from the heat generation by the continuous emission of the LED as well as minimizing a reduction in a communication speed while maintaining communication quality.

BRIEF DESCRIPTION OF THE DRAWINGS

The present invention will be detailed by way of the following drawings.

FIG. 4 is a view showing a corresponding example between bit rows and adjacent correction coefficients.

FIG. 14 is a view showing a correspondence between the 8-bit long transmission data and adjacent correction coefficients in the present invention.

FIG. 15 is a view showing a correspondence between the 8-bit long transmission data and adjacent correction coefficients in the present invention.

FIG. 16 is a view showing a correspondence between the 8-bit long transmission data and adjacent correction coefficients in the present invention.

FIG. 17 is a view showing a correspondence between the 8-bit long transmission data and adjacent correction coefficients in the present invention.

FIG. 18 is a view showing a correspondence between the 8-bit long transmission data and adjacent correction coefficients in the present invention.

FIG. 19 is a view showing a correspondence between the 8-bit long transmission data and adjacent correction coefficients in the present invention.

FIG. 20 is a view showing a correspondence between the 8-bit long transmission data and adjacent correction coefficients in the present invention.

FIG. 21 is a view showing a correspondence between the 8-bit long transmission data and adjacent correction coefficients in the present invention.

DESCRIPTION OF THE PREFERRED EMBODIMENTS

Figure 1:
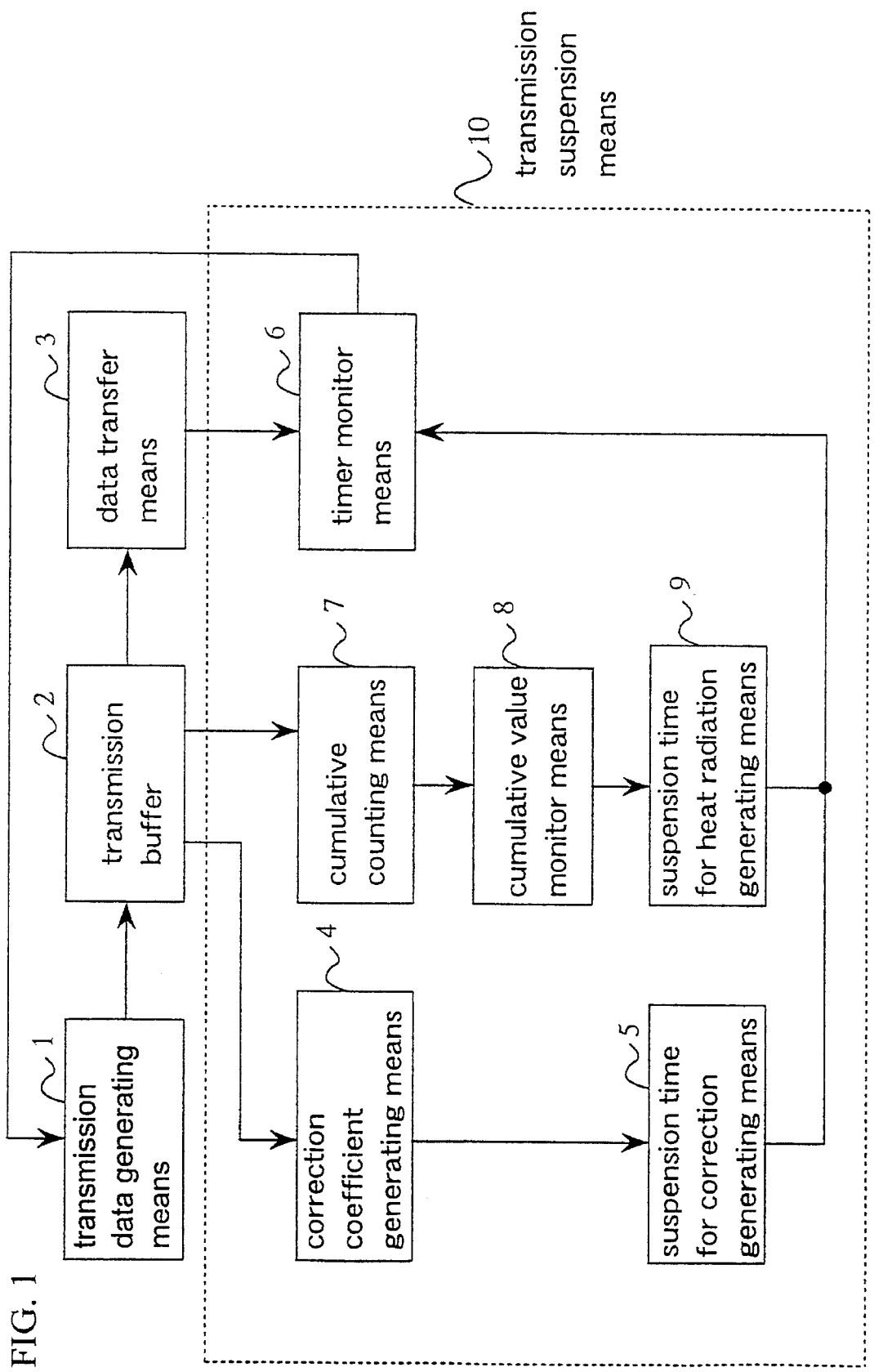
FIG. 1 is a block diagram showing a basic structure of the present invention.

FIG. 1 is a block diagram showing a basic structure of the present invention.

Referring to FIG. 1, transmission data generating means 1 combines digital data comprising a bit row represented by two values "0" and "1" into a predetermined format to send one transmission unit of transmission data. The means 1 is usually realized by a central processing unit (CPU).

A transmission buffer 2 stores the one transmission unit of the transmission data. A RAM is usually used as the transmission buffer 2.

Data transfer means 3 primarily comprises a circuit for modulating and demodulating a digital signal and a circuit for emitting and receiving infrared rays. Preferably, an LED is used for infrared rays emission.

Transmission suspending means 10, as described above, generates a transmission suspension time that should be added after the one transmission unit of the transmission data has been transmitted. The means 10 is usually realized by a CPU.

Furthermore, the transmission suspending means 10 may comprise correction coefficient generating means 4 for generating an adjacent correction coefficient defined by the number of two values "0" and "1" constituting the one transmission unit of the transmission data that has been stored in the transmission buffer 2;

Means 5 for generating a suspension time for correction in which the transmission suspension time that is added after the data transfer means 3 has sent the one transmission unit of the transmission data is determined from the adjacent correction coefficient;

Timer monitoring means 6 for detecting that the above data transfer means 3 has completed the transmission of the one transmission unit of the transmission data, counting the passage of the transmission suspension time that has been output from the means 5 for generating the suspension time for correction, and giving, after the passage of the transmission suspension time, an instruction for generating the next data to the transmission data generating means 3.

In the above process, when the correction coefficient generating means 4 determines the above adjacent correction coefficient (n), the initial value of the adjacent correction coefficient (n) is preferably set to 0, a bit row constituting the one transmission unit of the transmission data stored in the transmission buffer 2 is preferably retrieved in the order of the transmission, and each bit value is preferably confirmed so that when two or more "1's" continue, continued number of "1's" less 1 (CT1) is added to n while subtracting from n continued number of "0's" that follow the bit row of the continued "1's" less 1 (CT0) and when n satisfies a formula of n<0 n is set to 0 thereby continuing the above addition of CT1 and subtraction of CT0 until the confirmation of the one transmission unit of the transmission bit row is terminated.

Furthermore, as shown in FIG. 1, the transmission suspending means 10 in the present invention may comprise cumulative counting means 7 for counting the number of "1's" that constitute the one transmission unit of the transmission data stored in the transmission buffer and outputting the cumulative value thereof;

cumulative value monitoring means 8 for monitoring the cumulative value as to whether or not the cumulative value exceeds a predetermined cumulative peak;

means 9 for generating a suspension time for heat radiation that is added after the data transfer means 3 has sent the one transmission unit of the transmission data when the cumulative value exceeds the predetermined cumulative peak; and timer monitoring means 6 for detecting that the data transfer means 3 has completed the transmission of the one transmission unit of the transmission data, counting the passage of the transmission suspension time that has been output from the means 9 for generating a suspension time for heat radiation, and giving, after the passage of the transmission suspension time, an instruction for generating the next data to the transmission data generating means 3.

In addition, as shown in FIG. 1, the transmission suspending means 10 may comprise correction coefficient generating means 4, means 5 for generating the suspension time for correction, cumulative counting means 7, cumulative value monitoring means 8, means 9 for generating the suspension time for heat radiation and timer monitoring means 6, the timer monitoring means 6 detecting that the data transfer means 3 has completed the transmission of the one transmission unit of the transmission data, counting the passage of time corresponding to the transmission suspension time output from the means 5 for generating the suspension time for correction and/or to the transmission suspension time output from the means 9 for generating the suspension time for heat radiation thereby giving, after the passage of this transmission suspension time, an instruction for generating the next data to the transmission data generating means 3.

The timer monitoring means 6 is a counter that counts set values at a definite interval and the means 6 can be provided either inside or outside of the CPU.

The CPU has memories such as a RAM and a ROM as peripheral circuit thereof. In many cases, the CPU may have an input/output control interface circuit for inputting and outputting data to and from external devices.

The ROM stores a program in which a procedure is written which CPU follows for executing the function of the above means.

In the RAM are set in advance a transmission buffer for storing one transmission unit of transmission data, a region for storing transfer data, and a region for storing data required for the processing in each means such as correction coefficient, cumulative value and suspension time.

The outline of the operation of the data transfer apparatus utilizing infrared rays will be shown herein below. Digital data comprising a bit row represented by two values "0" and "1" is combined into one transmission unit of format defined by the transmission data generating means 1 for data transmission.

One transmission unit of transmission data generated from the transmission data generating means 1 is once stored in the transmission buffer 2, modulated by the data transfer means 3 to be sent into a space from infrared rays emitting LED. In this process, the correction coefficient generating means 4 determines adjacent correction coefficient from the number of "0" and "1" constituting transmission data stored in transmission buffer 2.

The adjacent correction coefficient n is determined by setting at the outset the initial value thereof to 0, followed by retrieving a bit row constituting the above transmission data in the order of data transmission to confirm each bit value so that when two or more "1's" continue, continued number of "1's" less 1 (CT1) is added to n while subtracting from n continued number of "0's" that follow a bit row of the continued "1's" less 1 (CT0) and when n satisfies a formula of n<0 n is set to 0 thereby continuing the above addition of CT1 and subtraction of CT0 until the confirmation of one transmission unit of transmission bit row is terminated.

In the subsequent process, the transmission suspension time is determined from the above adjacent correction coefficient which time should be added after the transmission data has been sent.

Then, the timer monitoring means 6, after detecting that the transmission of transmission data stored in the transmission buffer 2 has been completed, counts the passage of the transmission suspension time while giving to the transmission data generating means 1 an instruction for generating the next data after the passage of the transmission suspension time.

In addition, the transmission suspension time can be determined by counting the number of "1's" constituting transmission data in stead of determining the transmission suspension time by determining the adjacent correction coefficient. In such case, the cumulative counting means 7 counts the number or the cumulative value of "1"constituting one transmission unit of transmission data stored in the transmission buffer 2.

Then, the cumulative value monitoring means 8 monitors the cumulative value as to whether or not the cumulative value exceeds a predetermined cumulative peak so that transmission suspension time is generated that is added after the means 9 for generating suspension time for heat radiation sends transmission data when the cumulative value exceeds the predetermined cumulative peak.

Thus, the present invention provides a transmission suspension time, or time for suspending LED emission which corresponds to a bit row constituting one transmission unit of transmission data so that the decrease in the communication speed can be minimized while maintaining the quality of communication.

The present invention will be detailed by way of preferred embodiments shown in the drawings but it is not limited thereto.

Figure 2:
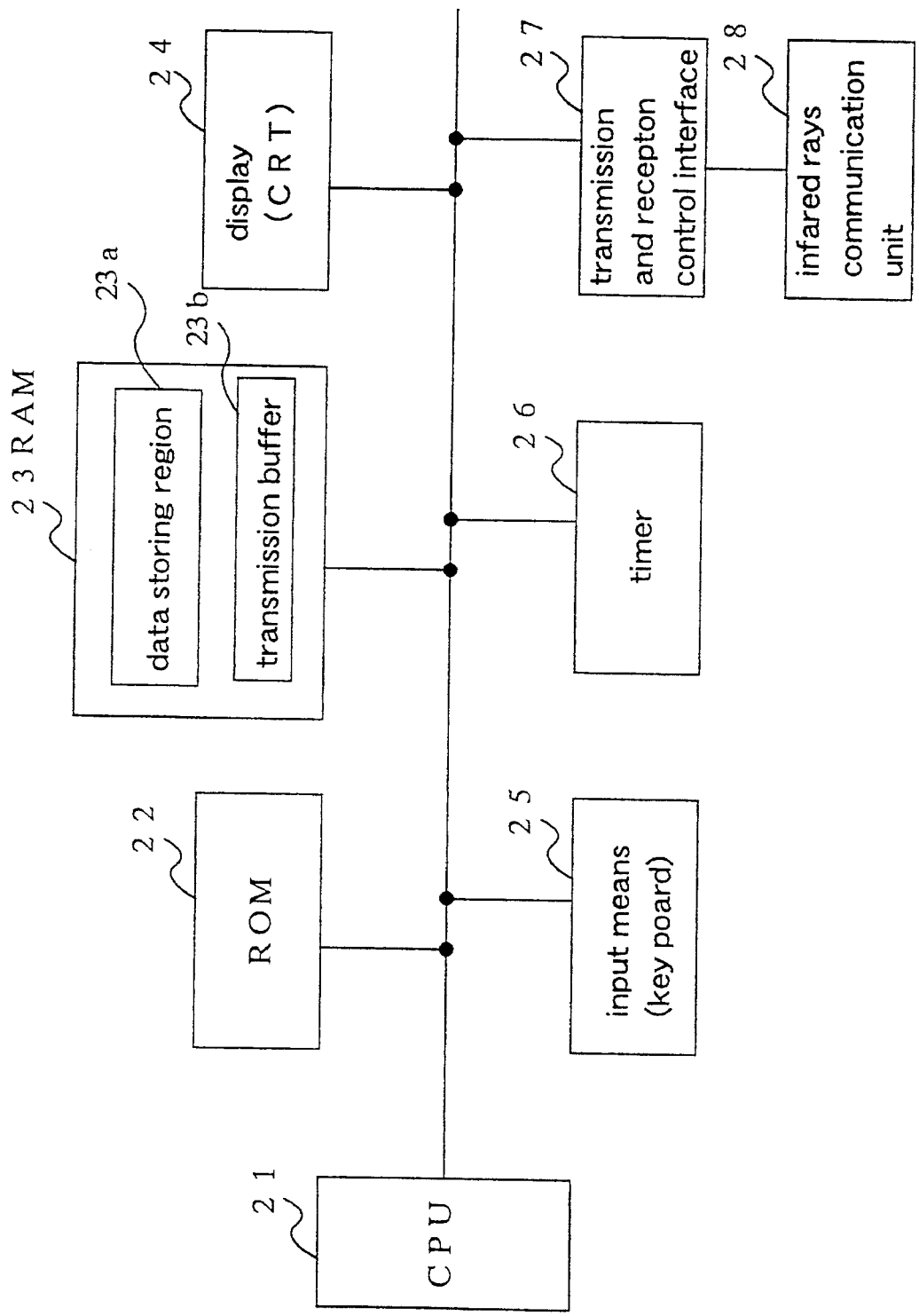
FIG. 2 is a block diagram showing a construction of an embodiment of the present invention.

FIG. 2 is a block diagram showing a basic structure of an information processor utilizing a data transfer apparatus of the present invention.

The information processor here includes devices such as word processors and personal computers provided with the function of data transmission utilizing infrared rays.

For space transmission utilizing infrared rays, a device for data transmission is preferably arranged at a location having a wide view in the same room.

Reference Numeral 21 designates a CPU, which allows execution of various functions such as data transmission and document preparation in this information processor.

Reference Numeral 22 designates a ROM which stores a program executed by the CPU 21 and fixed data.

Reference Numeral 23 designates a RAM which temporarily stores data required for executing each function. With particular reference to data transmission, the RAM stores transmission data, received data, information required for assembling transmission data and extraction of received data, and various values such as values set by a timer, counted values and pointer addresses.

Reference Numeral 24 designates a display for which a CRT or a liquid crystal display can be used.

Reference Numeral 25 designates an input device for which a keyboard, or a pointing device such as a mouse, a pen or a track ball can be used to designate the processing of data transmission and reception.

Reference Numeral 26 designates a timer for setting time that constitutes the basis of data communication and counting the passage of the time, the timer, for example, setting and counting time for LED emission suspension.

Reference Numeral 28 designates an infrared rays communication unit comprising an infrared rays emitting LED, a carrier wave frequency generating circuit, a modulation circuit, and an amplifier. The unit conventionally used in an infrared rays remote control device can be used.

Here, the infrared rays communication unit 28, like a conventional device shown in the related art, emit infrared rays having a predetermined frequency when the bit value assumes "1" whereas the unit stops infrared rays emission when the bit value assumes "0".

Reference Numeral 27 designates a transmission and reception control interface for controlling the transfer of one transmission unit of transmission data sent from the CPU 21 to the infrared rays communication unit 28 and controlling the transfer of data received from the infrared communication unit 28 to the CPU 21:

Embodiment 1

Embodiment 1 of the present invention will be detailed herein below.

Time for LED emission suspension is set by determining an adjacent correction coefficient from a bit row in one transmission unit of data.

FIG. 4 shows an example of a bit row in one transmission unit of transmission data as well as adjacent correction coefficient for use in Embodiment 1 corresponding to each transmission data and the number of "1's" that appears.

Referring to FIG. 4, one transmission unit of transmission data comprises a start bit, 8-bit long data represented by B0 through B7, a parity bit and a stop bit, which constitutes 11 bit in total.

Here, the start bit is to assume "1" without fail whereas the stop bit is to assume "0"without fail. The parity bit is given as an even number parity so that the parity bit assumes "1" when the number of "1's" in bit rows B0 through B7 is given in an even number whereas the parity bit assumes "0" when the above number in the same bit rows is given in an odd number.

Figure 3:
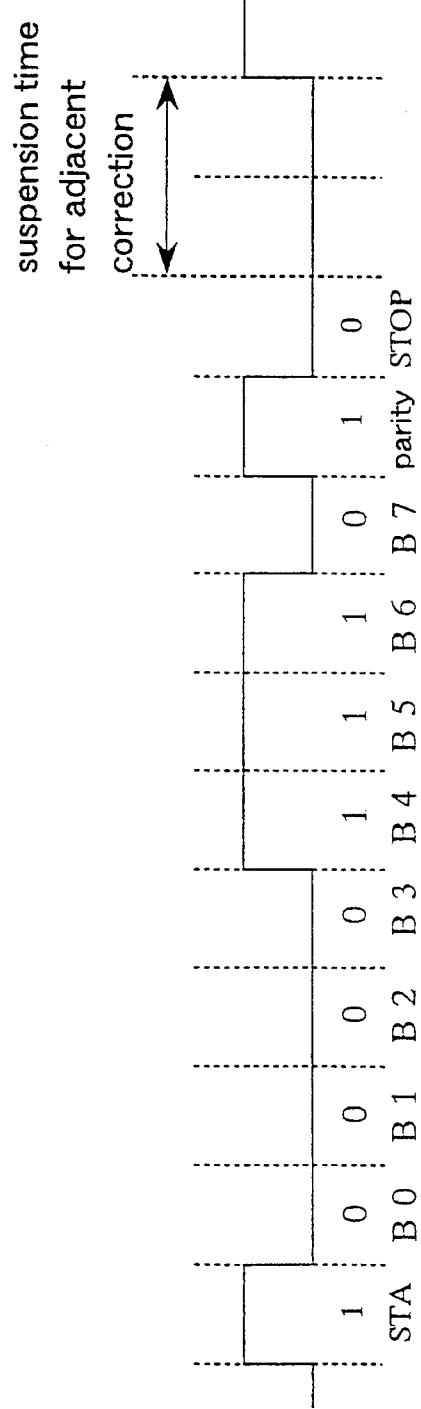
FIG. 3 is a model view showing a bit row structure of transmission data in Embodiment 1 of the present invention.

FIG. 3 shows an example of a bit row of transmission data in Embodiment 1.

The RAM 23 temporarily stores transmission data to be sent whereas the CPU 21 fetches data in bytes (B0 through B7) so as to form transmission data as shown in FIG. 4 by adding a start bit, a parity bit and a stop bit.

A transmission buffer, which is a specific region secured in the RAM 23, stores the transmission data comprising a 11-bit long row thus formed.

The transmission data stored in the transmission buffer begins with the start bit, followed by being fetched in the order of B0 through B7, the parity bit, and the stop bit to be sent from the CPU 21 to the infrared rays communication unit 28.

The infrared rays communication unit 28 modulates, for example, with a 500 KHz sub-carrier wave, a signal expressing data "1" when the bit value assumes "1". The unit 28 also emits infrared rays from an LED after a predetermined time, for example, 1 msec by using a switching circuit in which a transistor is utilized. When the bit value assumes "0", the unit 28 stops emission of infrared rays.

In Embodiment 1 of the present invention, a suspension time for adjacent correction is provided in which LED emission stops after the transmission of the stop bit as shown in FIG. 3.

The suspension time for adjacent correction is to be determined by the adjacent correction coefficient as shown below.

The adjacent correction coefficient is a value determined by the continuous number of "1's" included in a bit row of 11 bit-long transmission data which constitute one transmission unit and the continuous number of "0's" that follows the "1's", which value is used for setting a suspension time secured after the transmission of one transmission unit of bit row or heat radiation time of infrared rays emitting LED.

An example is shown in which the adjacent correction coefficient is determined in Embodiment 1.

Let the adjacent correction coefficient be represented by n, the initial value thereof be represented by n=0. The first step is to examine whether two or more "1's" recur in the order of transmission in a bit row of the one transmission unit of the transmission data. In other words, the examination is made from the start bit. When two or more "1's" recur, the number of recurring "1's" less 1 is memorized as an adjacent correction coefficient n. Here, when the number of recurring "1's" less 1 is represented by CT1, an equation n=CT1 is given.

The subsequent step is to examine whether two or more recurring bits of "0's" are present that follow the recurring bits of "1's". When there is one bit of "0" that follows the recurring bits of "1's", which is further followed by additional recurring bits of "1's", the number of recurring "1's" less 1 (CT1) is calculated to be added to the above n. Thus an equation of n=n+CT1 is calculated.

When there are two or more recurring bits of "0's", the number of recurring bits of "0's" less 1 is memorized, which number is subtracted from the above n. When the number of recurring bits of "0's" less 1 is designated by CT0, an equation of n=n−CT0 is to be calculated.

Here, when the adjacent correction coefficient n is in the negative, the coefficient n is set to 0 thereby providing an equation of n=0.

This is because the recurring bits of "0's" are longer than the recurring bits of "1's", and suspension time in which the LED does not blink can be sufficiently taken, and negative suspension time cannot be set, or the suspension time cannot be physically contracted.

Thus, the CT0 and the CT1 are determined in the order of the bit row to be sent for each transmission unit so that the CT1 is added to n and the CT0 is subtracted from n. When n is given in the negative in the midway, n is set to 0 thereby providing an equation of n=0 so that the above calculation is continued until the confirmation of recurring bits of "1's" and recurring bits of "0's" is completed with respect to all the 11 bit rows in one transmission unit. Thus the coefficient n given after the completion of calculation is memorized as an adjacent correction coefficient of bit rows in one transmission unit.

Thus, the adjacent correction coefficient is memorized. A concrete example thereof will be explained with respect to FIG. 4.

In a transmission bit row shown in FIG. 4 A, there can be found in B4 to B7 a bit row in which four 1's recur.

The bit row can be detected, for example, when the CPU 21 retrieves transmission data in order from the start bit to confirm that each bit value is given as "1" and to count the number of recurring "1's". In this process, the CPU 21 memorizes an equation of CT1=4−1=3 which provides a value of n=3.

Subsequently, the parity bit and the stop bit are both given as "0". Since two "0's" recur, an equation of CT0=2−1=1 is memorized. Here, an equation of n=n−CT0=3−1=2 is given. Thus all the bit rows in one transmission unit are examined, the adjacent correction coefficient here assumes 2.

With respect to the transmission bit row shown in FIG. 4B, more than one "1's" recur in the start bit and B0, an equation of CT1=2−1=1 is established. After that, "0's" recur in B1 through B3. Here an equation of CT0=3−1=2 is established.

Thus the adjacent correction coefficient n is given as −1 from an equation of n=CT1−CT0=1−2=−1. Since n is in the negative to be expressed as n<0, n is set to 0 to be expressed as n=0 as described above.

Additionally, since five "1's" recur from B4 to the parity bit, an equation of CT1=5−1=4 is established. Thus n is set to 4 from an equation of n=n+CT1=0+4=4.

Since only the stop bit "0" is present after that, the adjacent correction coefficient is given as 4 in this particular example.

In case of a transmission bit row shown in FIG. 4C, three "1's" recur from the start bit to B1 (CT1=2), followed by two recurring "0's" from B2 to B3 (CT0=1), an equation of n=2−1=1 (>0). Thereafter since four "1's" recur from B4 to B7 (CT1=3), followed by two recurring "0's" in the parity bit and the stop bit (CT0=1), an equation of n=n+CT1−CT0= 1+3−1=3 is established. Thus, in this particular example, the adjacent correction coefficient assumes 3.

So far, concrete examples of determination of the adjacent correction coefficient have been discussed. Bit rows of data represented by 8 bits of B0 through B7 are available in 256 different sets. In the same manner, the adjacent correction coefficient can be determined relative to respective data.

A suspension time for adjacent correction set in advance is determined relative to the value of this adjacent correction coefficient.

For example, in FIG. 3, the adjacent correction coefficient assumes 2. In this particular example, the suspension time for adjacent correction is provided corresponding to the time for 2 bit data transmission.

This suspension time for adjacent correction should be set in different values depending on various conditions such as the deterioration properties of infrared rays emitting LED to be used, a luminescent power thereof, a data transmission speed thereof, and outside temperatures in the neighborhood of the LED used. The time cannot be set singly from the adjacent correction coefficient.

Consequently, the conditions can be preferably set and entered from keyboards or the like, and the suspension time can be preferably adjusted which corresponds to a certain adjacent correction coefficient in consideration of the above conditions.

Figure 5:
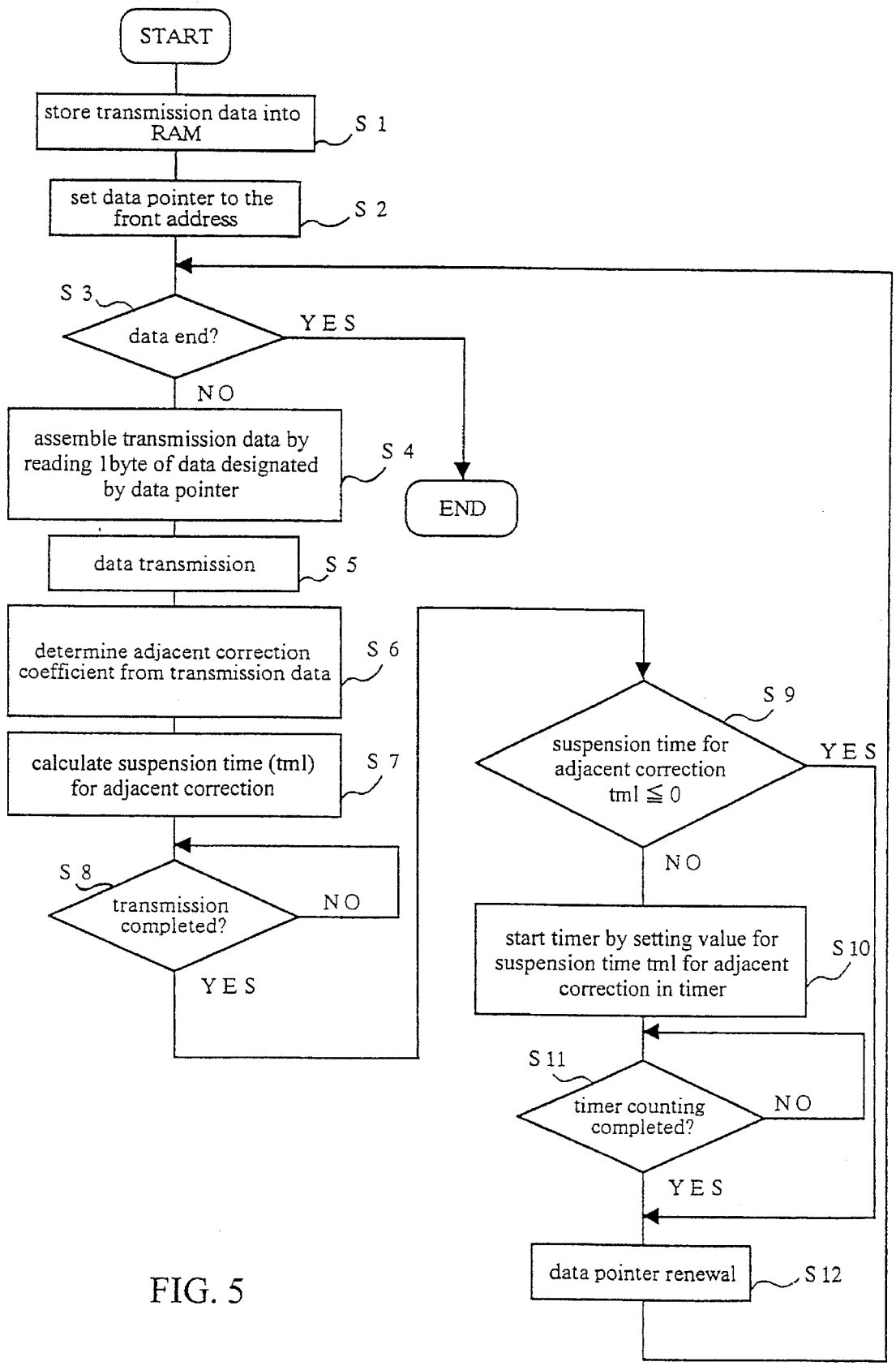
FIG. 5 is a flowchart of the data transmission in Embodiment 1 of the present invention.

FIG. 5 shows a flowchart of data communication in Embodiment 1 of the present invention.

The operation described hereinbelow is executed in accordance with a program which the CPU 21 stores in the ROM 22.

At step S1, the transmission data to be sent is stored in a specific data storing region in the RAM 23.

In addition, this specific data storing region is provided with an address for each byte. The initial value of a data pointer, which is designating an address in which one byte data to be sent is stored, is set in a front address of the data storing region (step S2).

Step S3 is to check for the presence of the transmission data to be sent. In the absence of the transmission data to be sent, the data transmission is terminated (data end). In the presence of such data, the process proceeds to step 4.

At step S4, one-byte long data is read which is stored in the address designated by the data pointer. The start bit, the parity bit and the stop bit are added into a format to be actually sent, which is stored in the transmission buffer in the RAM 23.

At step S5, the CPU 21 transfers transmission data stored in the transmission buffer to a data transmission and reception control interface 27 whereas the data transmission and reception interface 27 send the transmission data via the infrared rays communication unit 28.

As described above, the infrared rays communication unit 28 allows LED to emit infrared rays for a definite time when the data assumes "1" while terminating LED emission when the data assumes "0".

At step S6, while the data transmission and reception control interface 7 controls data transmission, the CPU 21 determines an adjacent correction coefficient corresponding to the transmission data stored in the transmission buffer. At step S7, a time for suspending LED emission or a suspension time tm1 for the adjacent correction is determined.

The adjacent correction coefficient is determined, as described above, from the difference in the number of recurring "1's" and the number of recurring "0's" both constituting 11-bit long bit row given as one transmission unit.

FIGS. 14 to 21 shows adjacent correction coefficients with respect with 256 different sets of one byte data determined by the above method.

Furthermore, the suspension time tm 1 for adjacent correction is determined from adjacent correction coefficients in consideration of factors such as deterioration properties of LED, and luminescent power thereof. The RAM 23 memorizes the adjacent correction coefficients and the suspension time tm 1 for adjacent correction.

At step S8, the CPU 21 monitors the data transmission at step S5 as to whether the transmission is terminated.

Desirably, a method by which the CPU 21 detects that the data transmission is terminated comprises either sending an interruption signal from the data transmission and reception control interface 27 to the CPU 21 at the termination of the data transmission, or receiving at the CPU 21 a response signal expressing the termination of data transmission sent from the data transmission and reception interface 27.

When the termination of data transmission is detected at step S8, the process proceeds to step S9.

At step S9, when the suspension time tm 1 for adjacent correction calculated at step S7 assumes less than 0, the process proceeds to step S12. When the suspension time tm 1 for adjacent correction is in the positive, the process proceeds to step S10.

At step 10, the CPU 21 sets the value of the suspension time tm1 determined at step S7 in the timer 26 and actuates the timer.

At step S11, the timer 26 continues counting until time is out. When the timer 26 completes the counting of the value of suspension time set by the timer 26, the timer 26 sends to CPU 21 a signal notifying the termination of counting. Otherwise, the CPU 21 detects the termination of counting at the timer 26 using a method by which the CPU 21 permanently monitors the state of the timer 26 with the result that the CPU 21, after detecting the termination of counting at the timer 26, renews the data pointer to designate the address of the subsequent transmission data to read the transmission data (Step S12).

After the data pointer is renewed, the process returns to step S3 for sending the subsequent transmission data.

After returning to step S3, the subsequent data is to be sent. However, the LED emission is terminated during the time when the timer 26 counts the suspension time. Thus, the suspension time tm 1 for adjacent correction can be secured as shown in FIG. 3 before the subsequent data transmission starts.

In this manner, the slowing down of the data transfer speed can be better prevented by determining the adjacent correction coefficient from the number of recurring "0's" and "1's" in one transmission unit of bit row to set the suspension time that should be set after the termination of sending of one transmission unit of data than by setting a fixed suspension time as has been conventionally performed.

In other words, when a fixed suspension time is set as was conventionally performed, the fixed time that should be set when nine bits of "1's" recurs at the worst should be adopted as the fixed suspension time. Consequently the longest suspension time is set even when a bit row which do not require a long suspension time is sent so that the data transfer speed is made longer.

On the other hand, when the suspension time is set depending on the adjacent correction coefficient as can be seen in the present invention, the data transfer speed can be improved because assuming the transmission data is uniformly distributed the average of 256 sets of adjacent correction coefficient assumes 1.45, or only about one fifth of the maximum value 7 of the adjacent correction coefficient, which means that delay time of data transmission owing to the suspension time is contracted to about one fifth.

Furthermore, setting such suspension time suppresses heat generation in LED thus preventing the deterioration in the quality of data transmission.

Embodiment 2

In Embodiment 2 of the present invention, a suspension time for LED emission is set only when the number of "1's" to be sent exceeds a predetermined value in the process of sending a series of data.

Figure 6:
FIG. 6 is a model view showing a bit row structure of the transmission data in Embodiment 2 of the present invention.

FIG. 6 shows Embodiment 2 of the present invention. FIG. 6 shows only a bit row of data in one transmission unit. Generally, when data transmission continues for long hours, the number of "1's" to be sent is accumulated over bit rows in a certain number of transmission units. When the cumulative number of "1's" exceeds the predetermined cumulative peak thereof, the suspension time is set drier a bit row of transmission data. This suspension time is referred to as a suspension time for heat radiation.

The suspension time for heat radiation is set to radiate heat accumulated in LED's when the number of "1's" sent since the start of transmission of "1's" or the number of LED blinking exceeds a certain value.

Furthermore, as the predetermined cumulative peak means a value should be selected which exceeds the upper limit at which heat accumulated in LED by the transmission of "1's" is not likely to affect the data transmission.

The predetermined cumulative peak that constitutes the reference for setting the suspension time for heat radiation should be determined in consideration of the deterioration properties of infrared rays emitting LED's, a luminescent power, a data transmission speed and outside temperature in the neighborhood of LED's. Preferably, the predetermined cumulative peak and other conditions should can be set and entered.

Figure 7:
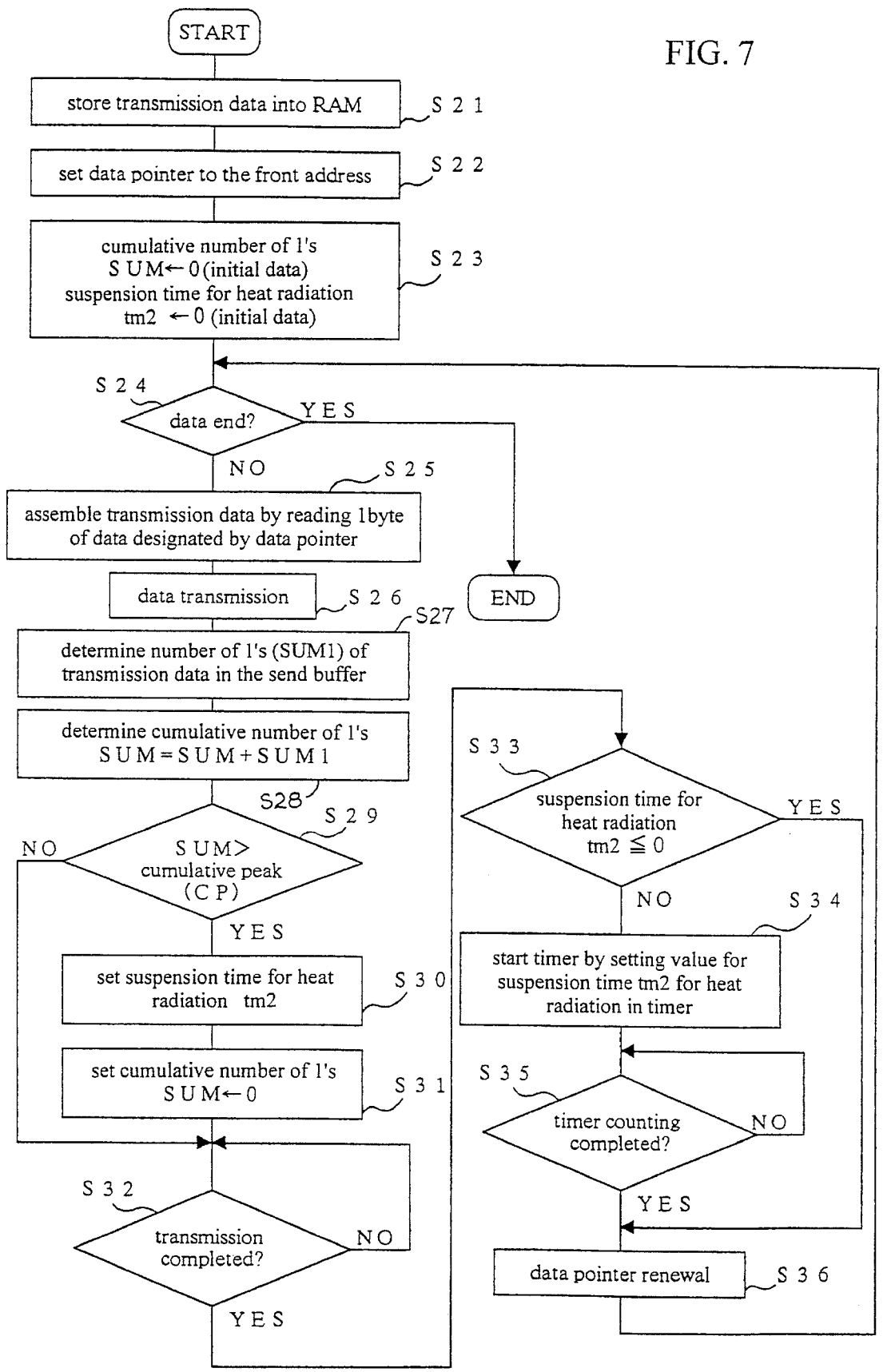
FIG. 7 is a flowchart of the data transmission in Embodiment 2 of the present invention.

FIG. 7 shows a flowchart of data transmission in Embodiment 2.

The ROM 22 or the RAM 23 are to store the predetermined cumulative peak (CP).

At step S21, the transmission data to be sent is stored in a specific data storing region within the RAM 23.

At step S22, the data pointer is set at the front address of the data storing region.

At step S23, an initial value "0" is set in a cumulative sum SUM counting the number of "1" that has been sent and in suspension time tm2 for heat radiation.

Step S24 is to check the presence of the transmission data to be sent. In the absence of the transmission data to be sent (data end), terminate the data transmission. In the presence of the transmission data to be sent, the process proceeds to step S25.

Step S25 is to read one byte-long data stored in an address designated by the data pointer, and to constitute 11 bit-long transmission data to be stored in the transmission buffer in the RAM 23.

At step S26, the CPU 21 transfers transmission data stored in the transmission buffer to the transmission and reception control interface 27, which, in turn, send transmission data via infrared rays communication unit 28.

Step S27 is to determine the sum SUM1 of "1's" included in the transmission data stored in the transmission buffer. Step S28 is to determine the cumulative sum SUM of "1's" that has been sent. Consequently, the SUM is determined by adding SUM1 and SUM: SUM=SUM+SUM1.

Step S29 is to determine whether the cumulative sum SUM of "1's" exceeds the cumulative peak (CP). When the SUM exceeds CP, the process proceeds to step S30. In other cases, the process proceeds to step S32.

At step S30 the suspension time value preset in the suspension time tm2 for heat radiation is set.

At step S31 the cumulative sum SUM of "1's" is set to 0 to newly count the sum of "1".

At step S32 the CPU 21 monitors the data transmission at step 26 as to whether the data transmission is completed.

When the termination of the data transmission is completed at step S32, the process proceeds to step S33.

When time set for the suspension time tm2 for heat radiation does not exceed 0 at step S33, the process proceeds to step S36. When a value set for the suspension time tm2 for heat radiation is in the positive, the process proceeds to step S34.

At step S34 the CPU 21 set in the timer 26 the suspension time tm2 for heat radiation to actuate the timer 26.

At step S35 the timer 26 continues counting until time is out. When the timer 26 completes the counting of the suspension time tm2 for heat radiation, the CPU 21 renews the data pointer to an address to the subsequent transmission data to read the subsequent transmission data (step S36).

After the CPU 21 renews the data pointer, the process returns to step S24 to send the subsequent transmission data. After the return to step S24, the subsequent data is to be transmitted. When the timer 26 counts the suspension time, the suspension time tm2 for heat radiation as shown in FIG. 6 is secured before the subsequent data transmission begins.

As described above, the number of "1" is counted which is included in a bit row of transmission data. When the cumulative number of "1" exceeds the cumulative peak, the reduction in the data transfer speed can be reduced by setting a predetermined suspension time for heat radiation after sending one transmission unit of transmission data than by setting a fixed suspension time.

The suspension time for adjacent correction shown in Embodiment 1 is determined from an adjacent correction coefficient determined by a bit row of data that is sent, and the suspension time for adjacent correction is set for each of the transmission data. On the other hand, the suspension time for heat radiation shown in Embodiment 2 is determined only immediately after the one transmission unit of the transmission data when the number of "1's" exceeds the predetermined cumulative peak, or when heat accumulated in LED's is judged to be very likely to affect the data transmission.

Furthermore, setting the suspension time for heat radiation allows inhibiting the heat radiation and the deterioration in the quality of the data transmission in the same manner as Embodiment 1.

Embodiment 3

Embodiment 3 of the data transfer apparatus according to the present invention will be detailed.

A suspension time in Embodiment 3 is set by combining the suspension time for adjacent correction shown in Embodiment 1 and the suspension time for heat radiation shown in Embodiment 2 in data transmission. Even in a longer transmission, heat radiation in LED is effectively promoted and the deterioration in the quality of the data transmission is to be inhibited.

Figure 8:
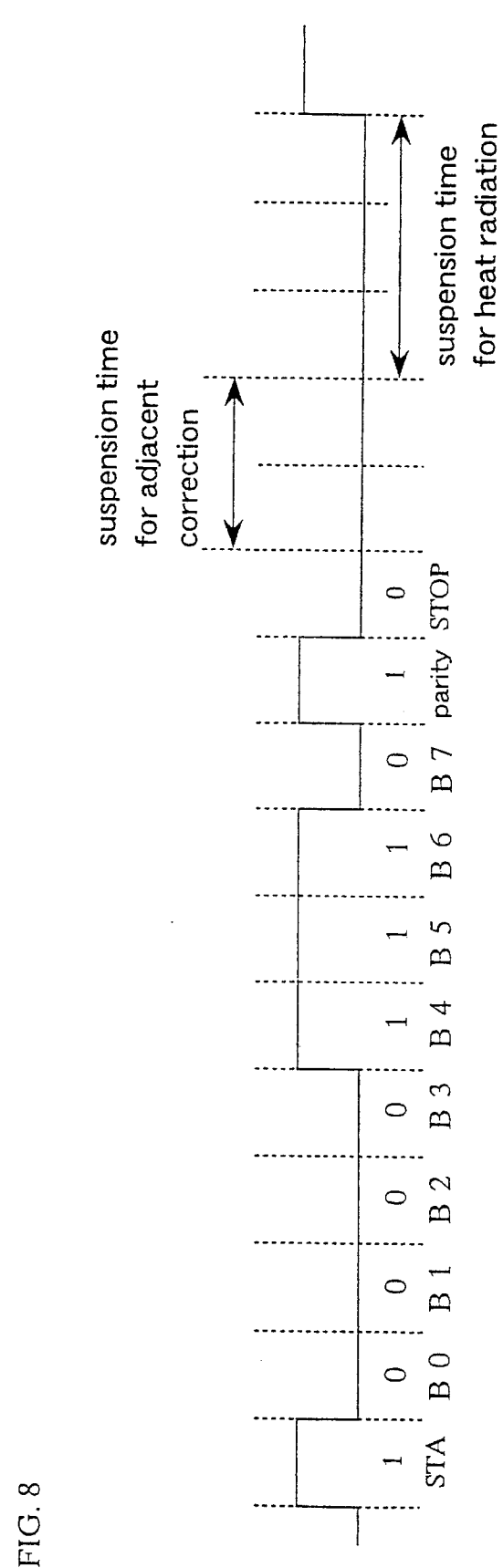
FIG. 8 is a model view showing a bit row structure of the transmission data in Embodiment 3 of the present invention.

FIG. 8 shows Embodiment 3 of a bit row of the data transmission.

Here, immediately after a bit row of one transmission unit, a suspension time for adjacent correction and a suspension time for heat radiation are set. As shown in Embodiment 1, the suspension time for adjacent correction is to be set for each transmission unit of data. As shown in Embodiment 2, the suspension time for heat radiation is set immediately after one transmission unit of transmission data when the number of transmission of "1's" exceeds the predetermined number, both suspension times are not necessarily set as shown in this Embodiment unlike Embodiment 3.

Figure 9:
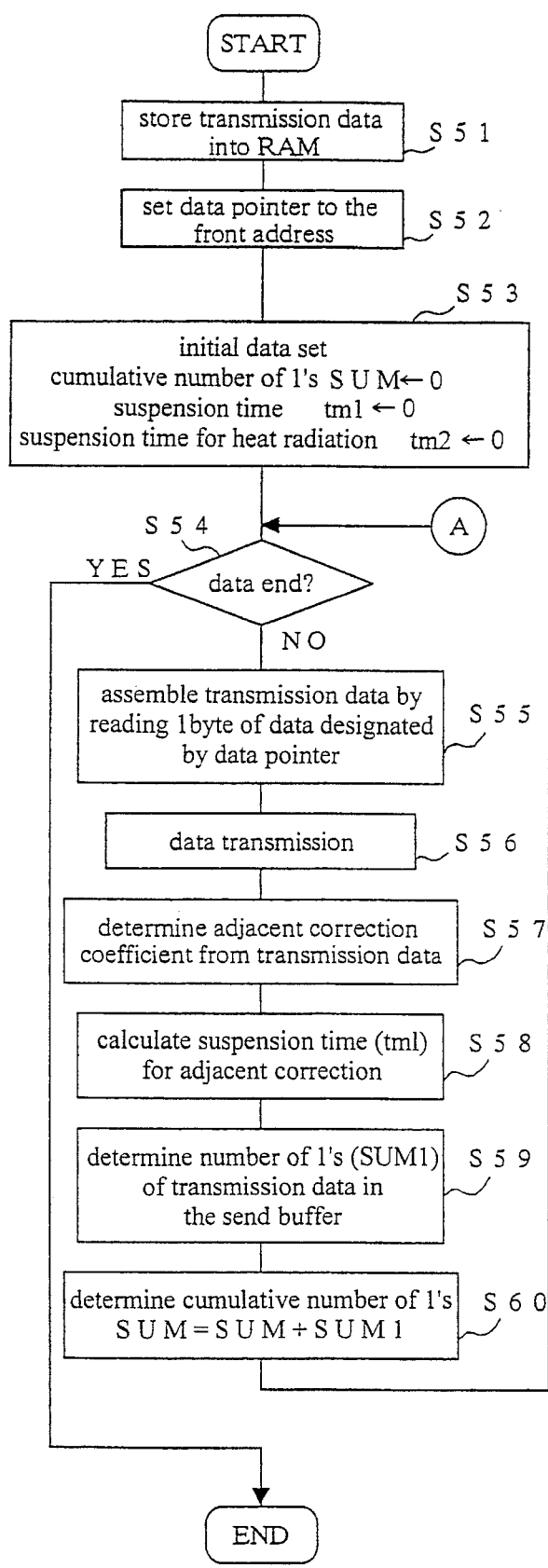
FIG. 9 is a flowchart of the data transmission in Embodiment 3 of the present invention.
Figure 9:
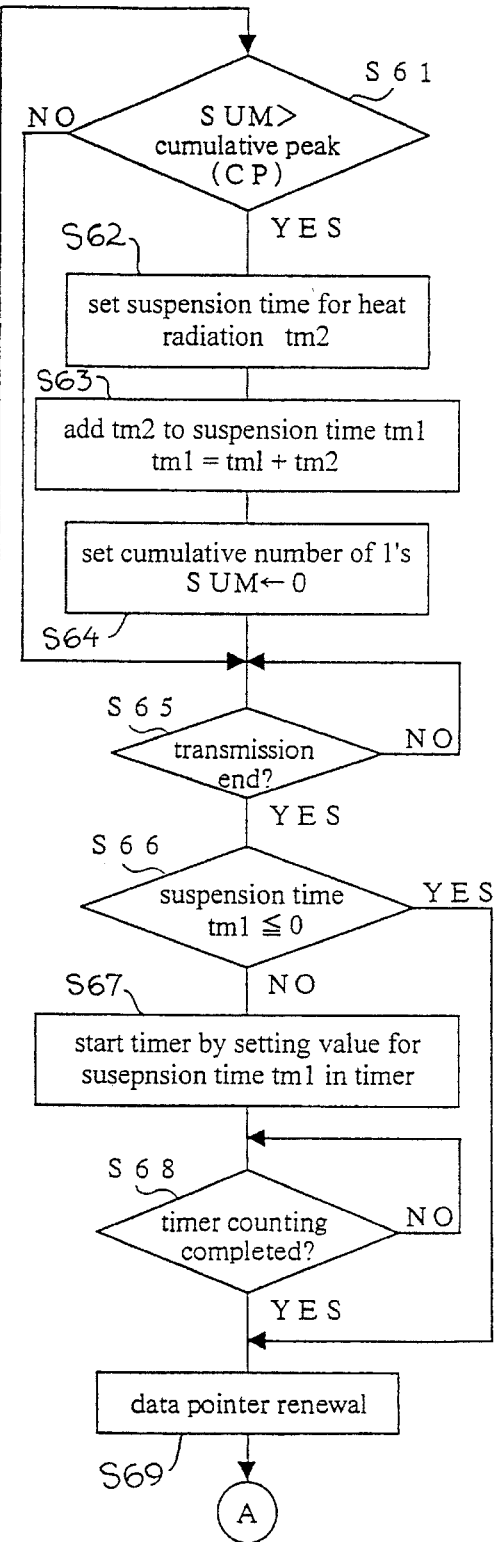
Figure 10:
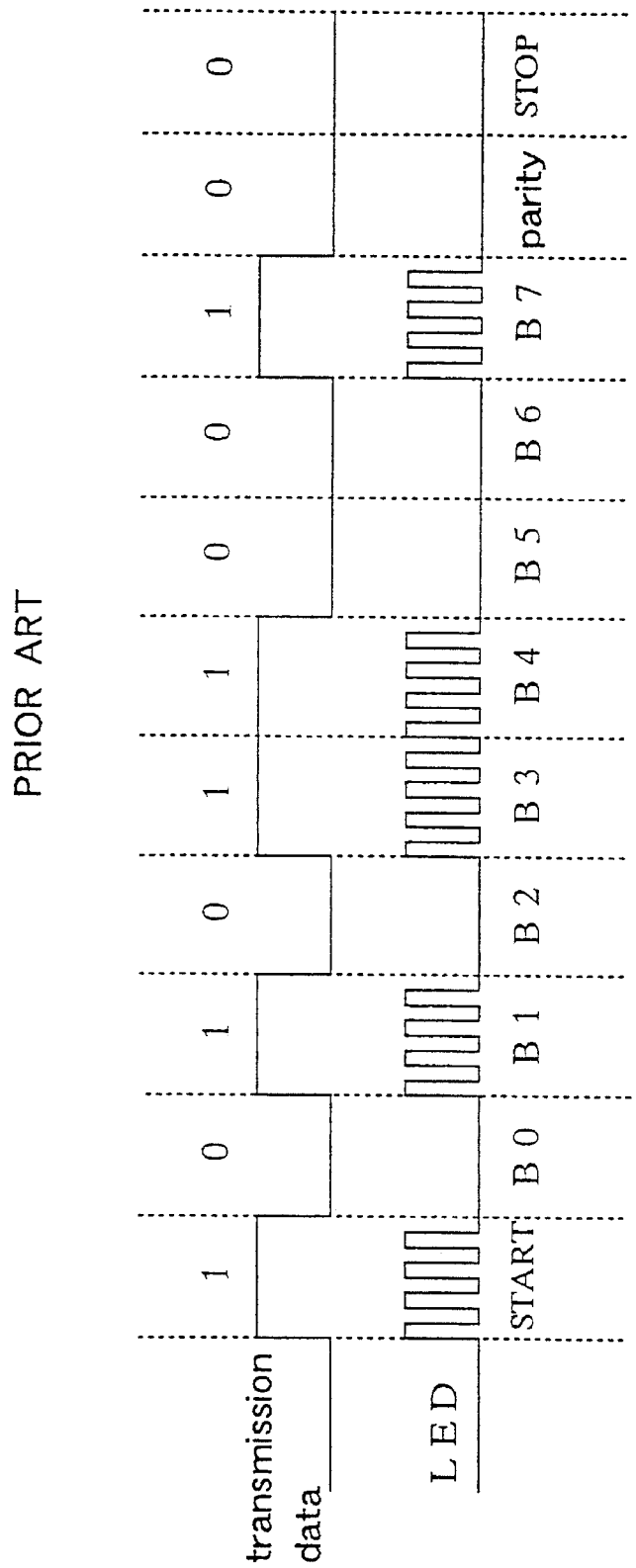
FIG. 10 is a view illustrating a relation between a bit row of the transmission data and LED blinking in the prior art.
Figure 11:
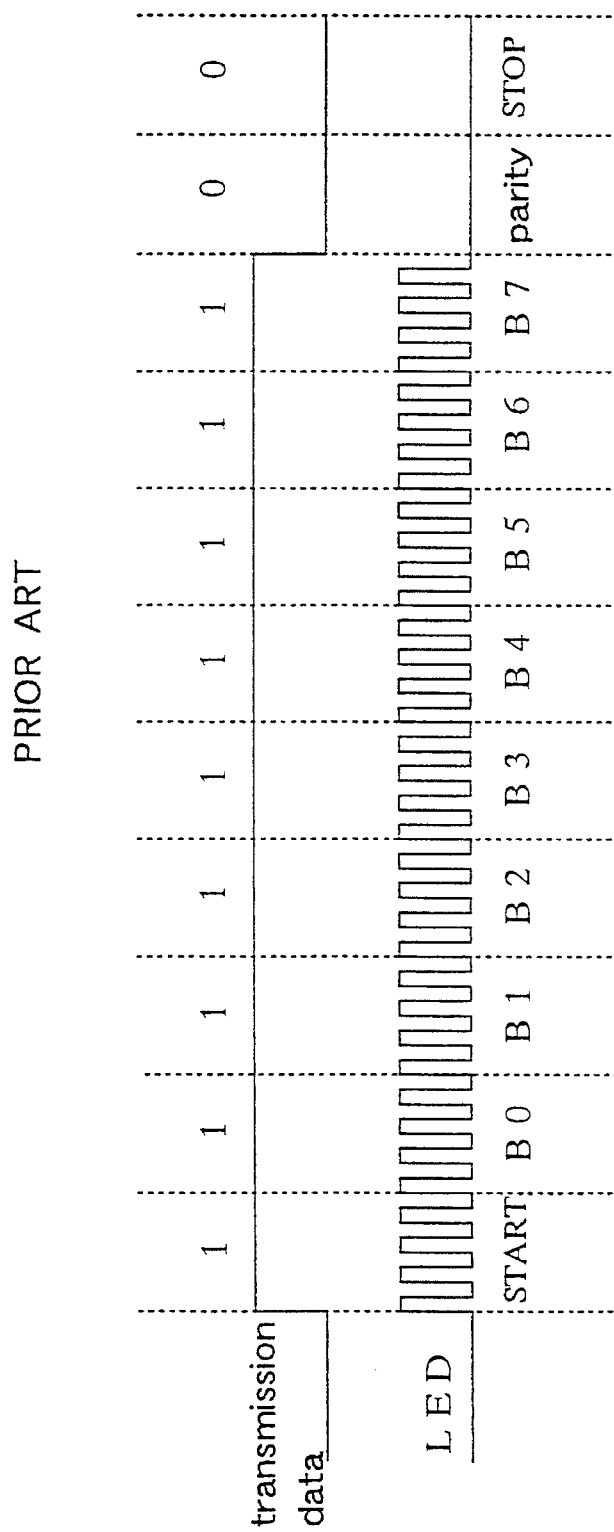
FIG. 11 is a view illustrating LED blinking when the transmission data is FFH in the prior art.
Figure 12:
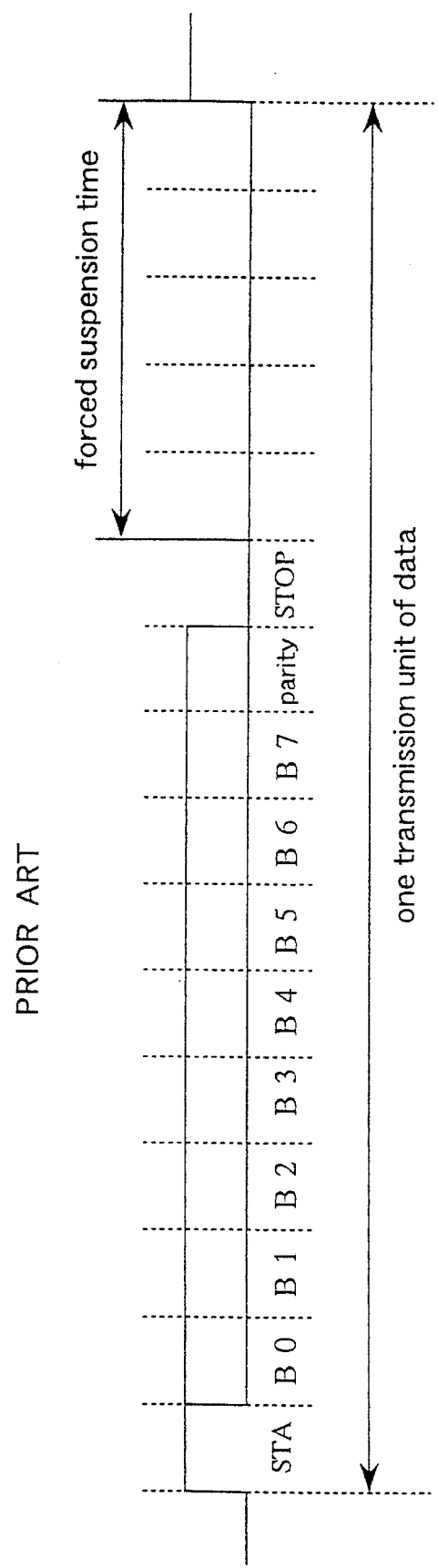
FIG. 12 is a view illustrating a case in which a compulsory suspension time is inserted into the transmission data in the prior art.
Figure 13:
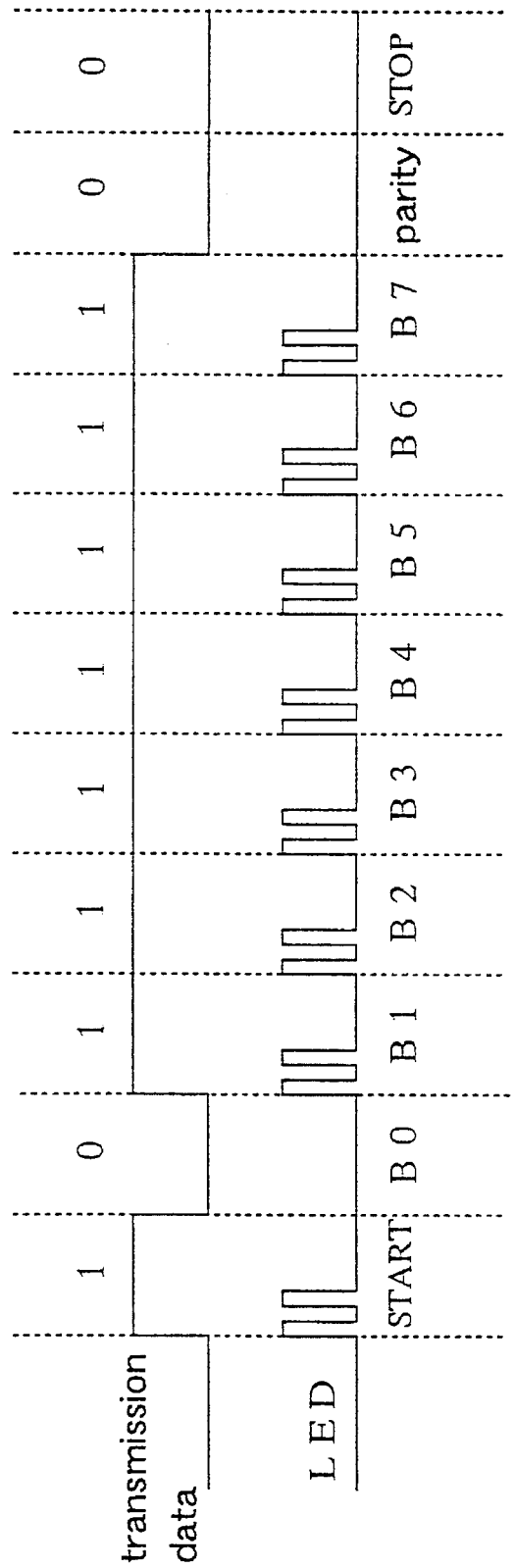
FIG. 13 is a view illustrating the data transmission by means of the RZ method in the prior art.

FIG. 9 shows a flowchart of the data transmission in Embodiment 3.

In the same manner as Embodiment 2, the RAM 23 stores the cumulative peak CP which is to be compared with the cumulative sum of "1" in advance.

Step S51 is to store data to be transmitted in a specific data storing region.

Step S52 is to set a data pointer in the front address of a data storing region.

Step S53 is to set the initial value 0 to a suspension time tm 1 that is to be set, the cumulative sum SUM that counts the number of data transmission "1" and a suspension time tm2 for heat radiation.

Step S54 is to check the presence of the transmission data to be sent. In the absence of the transmission data to be sent, the data transmission is terminated. In the presence of the transmission data to be sent, the process proceeds to step S55.

At step S55, one-byte long data is read which is stored in an address designated by the data pointer, and eleven-bit long data is assembled to be stored in the transmission buffer in the RAM 23.

At step S56, the CPU 21 transfers the transmission data stored in the transmission buffer to the transmission and reception control interface 27, which transmits the transmission data via infrared rays communication unit 28.

At step S57, the CPU 21 determines adjacent correction coefficients corresponding to the transmission data stored in the transmission buffer.

At step S58, a light emission suspension time of LED set in advance by the adjacent correction coefficients, or the suspension time for adjacent correction is determined to be substituted in the suspension time tm1.

At step S59, the sum SUM1 of "1's" is determined which is included in the transmission data stored in the transmission buffer.

At step S60, the cumulative sum SUM of "1's" is determined which has been transmitted. Thus an equation of SUM=SUM+SUM1 is determined.

Step S61 is to determine whether the cumulative sum SUM exceeds the cumulative peak CP. When the cumulative sum SUM exceeds the cumulative peak CP, the process proceed to Step S62. In other cases, the process proceeds to step S65.

At Step S62, the preset value of the suspension time is set to the suspension time tm2 for heat radiation.

At step S63, the suspension time tm2 is added to the suspension time tm1 that is to be set. Thus an equation of tm1=tm1+tm2 is calculated.

At step S64, the cumulative sum SUM is set to 0 to newly count the number of "1's".

At step S65 the CPU 21 monitors the data transmission at step S56 as to whether the data transmission is terminated or not.

When the termination of the data transmission is detected at step S65, the process proceeds to step S66.

At step 66, when time set in suspension time tm1 is 0 or less, the process proceeds to step S69. When time is in the positive, the process proceeds to step S67.

At step S67, the CPU 21 set the suspension time tm1 to the timer 26 to actuate the timer 26.

At step S68, the timer 26 continues counting until time is out. When the timer completes counting at the suspension time tm1, the CPU 21 renews the data pointer to designate the address of the following transmission data (step S69).

After the renewal of the data pointer, the process returns to step S54 to send the following transmission data.

As described above, heat radiation at LED can be effectively promoted, the deterioration in the quality of data transfer can be prevented by setting the suspension time combining the suspension time for adjacent correction and the suspension time for heat radiation during the data transmission of one transmission unit of the transmission data.

As explained above, in accordance with the present invention, heat radiation at LED can be appropriately inhibited and the deterioration in the communication speed can be minimized while maintaining the communication quality because an adjacent correction coefficient defined by the number of "0's" and "1's"' constituting one transmission unit is determined to generate the transmission suspension time that is added after the one transmission unit of the transmission data is sent, and the transmission suspension time is set after each cycle of sending the one transmission unit of the transmission data.

The sum of "1's" constituting the one transmission unit of the transmission data is counted so that the transmission suspension time is set only after the one transmission unit of the transmission data is sent when the cumulative sum of "1's" exceeds a predetermined value. This leads to an appropriate inhibition of heat radiation at LED and minimizing a reduction in communication speed while maintaining the quality of communication even in the continued data transmission in the long term.

Furthermore, the luminescence suspension time of LED is set by combining two kinds of transmission suspension time with the result that heat radiation at LED can be effectively promoted and the reduction in the quality of data transmission can be prevented.

What is claimed is:

1. A data transfer apparatus utilizing infrared rays comprising:

transmission data generating means for generating one transmission unit of transmission data;

a transmission buffer for storing said one transmission unit of said transmission data produced by said transmission data generating means;

data transfer means for modulating and transferring each of said transmission data in said one transmission unit stored in said transmission buffer into a space by utilizing an infrared ray emitting LED; and transmission suspending means for determining a transmission suspension time to be added after sending said one transmission unit of said transmission data determined based on the bit values included in said one transmission unit of said transmission data to be sent;

said data transfer means waiting said transmission suspension time before sending a next transmission unit of said transmission data.

2. A data transfer apparatus utilizing infrared rays comprising:

transmission data generating means for generating one transmission unit of transmission data;

a transmission buffer for storing said one transmission unit of said transmission data produced by said transmission data generating means;

data transfer means for modulating and transferring each of said transmission data in said one transmission unit stored in said transmission buffer into a space by utilizing an infrared ray emitting LED; and transmission suspending means for determining a transmission suspension time to be added after sending said one transmission unit of said transmission data determined based on the bit values included in said one transmission unit of said transmission data to be sent;

said data transfer means waiting said transmission suspension time before sending a next transmission unit of said transmission data;

wherein said transmission suspending means comprises:
   correction coefficient generating means for generating an adjacent correction coefficient defined by the number of two values "0" and "1" constituting said one transmission unit of said transmission data that has been stored in said transmission buffer;

means for generating a suspension time for correction in which said transmission suspension time is determined from the adjacent correction coefficient, said suspension time being added after said data transfer means has sent said one transmission unit of said transmission data;

timer monitoring means for detecting that said data transfer means has completed the transmission of said one transmission unit of said transmission data, counting the passage of said transmission suspension time that has been output from said means for generating said suspension time for correction, and giving, after the passage of said transmission suspension time, an instruction for generating the next data to said transmission data generating means.

3. A data transfer apparatus utilizing infrared rays comprising:

transmission data generating means for generating one transmission unit of transmission data;

a transmission buffer for storing said one transmission unit of said transmission data produced by said transmission data generating means;

data transfer means for modulating and transferring each of said transmission data in said one transmission unit stored in said transmission buffer into a space by utilizing an infrared ray emitting LED; and transmission suspending means for determining a transmission suspension time to be added after sending said one transmission unit of said transmission data determined based on the bit values included in said one transmission unit of said transmission data to be sent;

said data transfer means waiting said transmission suspension time before sending a next transmission unit of said transmission data;

wherein said transmission suspending means comprises;
   correction coefficient generating means for generating an adjacent correction coefficient defined by the number of two values "0" and "1" constituting said one transmission unit of said transmission data that has been stored in said transmission buffer;

means for generating a suspension time for correction in which said transmission suspension time is determined from the adjacent correction coefficient, said suspension time being added after said data transfer means has sent said one transmission unit of said transmission data;

timer monitoring means for detecting that said data transfer means has completed the transmission of said one transmission unit of said transmission data, counting the passage of said transmission suspension time that has been output from said means for generating said suspension time for correction, and giving, after the passage of said transmission suspension time, an instruction for generating the next data to said transmission data generating means;

wherein said transmission data generating means combines digital data comprising a bit row represented by two values "0" and "1" into a predetermined format for said one transmission unit of said transmission data to be stored in a transmission buffer, said correction coefficient generating means sets an initial value of said adjacent correction coefficient to "0", retrieves a bit row constituting said one transmission unit of said transmission and confirms each bit value so that when two or more "1's" continue, continued number of "1's" less 1 (CT1) is added to n while subtracting from n continued number of "0's" that follow a bit row of the continued "1's" less 1 (CT0) and when n satisfies the formula of n<0 n is set to 0 thereby continuing the above addition of CT1 and subtraction of CT0 until the confirmation of one transmission unit of transmission bit row is terminated.

4. A data transfer apparatus utilizing infrared rays comprising:

transmission data generating means for generating one transmission unit of transmission data by combining digital data comprising a bit row represented by two values of "0"and "1"into a predetermined format;

transmission buffer for storing said one transmission unit of said transmission data;

data transfer means for modulating and transferring each of said transmission data in said one transmission unit into a space by utilizing an infrared ray emitting LED, each of said transmission data being stored in said transmission buffer; and transmission suspending means for generating transmission suspension time that should be added after said one transmission unit of said transmission data has been sent when the cumulative number of bit values of "1" or "0"that have ben sent exceeds a predetermined number;

said data transfer means sending said one transmission unit of said transmission data at an interval of said transmission suspension time produced by said transmission suspending means only in a case where the cumulative number exceeds the predetermined number.

5. A data transfer apparatus utilizing infrared rays comprising:

transmission data generating means for generating one transmission unit of transmission data by combining digital data comprising a bit row represented by two values of "0" and "1" into a predetermined format;

transmission buffer for storing said one transmission unit of said transmission data;

data transfer means for modulating and transferring each of said transmission data in said one transmission unit into a space by utilizing an infrared ray emitting LED, each of said transmission data being stored in said transmission buffer; and transmission suspending means for generating transmission suspension time that should be added after said one transmission unit of said transmission data has been sent when the cumulative number of bit values of "1" or "0" that have ben sent exceeds a predetermined number;

said data transfer means sending said one transmission unit of said transmission data at an interval of said transmission suspension time produced by said transmission suspending means only in a case where the cumulative number exceeds the predetermined number;

wherein said transmission suspending means comprises cumulative counting means for counting the number of "1's" that constitute said one transmission unit of said transmission data stored in said transmission buffer and outputting the cumulative value thereof;

cumulative value monitoring means for monitoring the cumulative value as to whether or not the cumulative value exceeds a predetermined cumulative peak;

means for generating a suspension time for heat radiation that is added after the data transfer means has sent said one transmission unit of said transmission data when the cumulative value exceeds the predetermined cumulative peak; and timer monitoring means for detecting that said data transfer means has completed the transmission of said one transmission unit of said transmission data, counting the passage of said transmission suspension time that has been output from said means for generating said suspension time for heat radiation, and giving, after the passage of said transmission suspension time, an instruction for generating the next data to said transmission data generating means.

6. A data transfer apparatus utilizing infrared rays comprising:

transmission data generating means for generating one transmission unit of transmission data by combining digital data comprising a bit row represented by two values of "0" and "1" into a predetermined format;

transmission buffer for storing said one transmission unit of said transmission data;

data transfer means for modulating and transferring each of said transmission data in said one transmission unit into a space by utilizing an infrared ray emitting LED, each of said transmission data being stored in said transmission buffer; and transmission suspending means for generating transmission suspension time that should be added after said one transmission unit of said transmission data has been sent when the cumulative number of bit values of "1" or "0" that have ben sent exceeds a predetermined number;

said data transfer means sending said one transmission unit of said transmission data at an interval of said transmission suspension time produced by said transmission suspending means only in a case where the cumulative number exceeds the predetermined number;

further comprising:

cumulative counting means for counting the number of "1's" that constitute said one transmission unit of said transmission data stored in said transmission buffer and outputting the cumulative value thereof;

cumulative value monitoring means for monitoring the cumulative value as to whether or not the cumulative value exceeds the predetermined cumulative peak;

means for generating a suspension time for heat radiation that is added after the data transfer means has sent said one transmission unit of said transmission data when the cumulative value exceeds the predetermined cumulative peak; and said time monitoring means for detecting that said data transfer means has completed the transmission of said one transmission unit of said transmission data, counting the passage of time corresponding to said transmission suspension time output from said means for generating suspension time for correction and/or to said transmission suspension time output from the means for generating said suspension time for the heat radiation, and giving, after the passage of said transmission suspension time, an instruction for generating the next data to said transmission data generating means.

7. A method for transmitting a series of data units using infrared rays, comprising the steps of:

formatting one of the data units for transmission;

storing the data unit;

analyzing actual values of bits of the stored data unit including determining a number of bits having a "1" or a "0" value:

transmitting the stored data unit using infrared rays; and determining whether to delay transmission of a next data unit based on the analyzing step.

8. The method in claim 7, wherein when infrared transmission is to be delayed, the delay amount is determined based on the number of bits having a "1" value and the number of bits having a "0" value in the one data unit such that the delay mount varies depending on the number of bits having a "1" value and the number of bits having a "0" value in the one data unit.

9. The method in claim 8, wherein the delay amount increase when the number of consecutive bits having a "1" value in the one data unit increases and the number of consecutive bits having a "0" value in the one data unit decreases.

10. The method in claim 8, wherein the delay amount is proportional to a difference between a number of consecutive "1" bits and a number of consecutive "0" bits in the one data unit.

11. The method in claim 8, wherein the delay amount is calculated in accordance with the following:

$$N=CT1-CT0$$

where the delay amount is proportional to a correction coefficient N, CT1 is the number of consecutive "1" bits minus 1 in the one data unit, CT0 is the number of consecutive "0" bits minus 1 in the one data unit.

12. The method on claim 7, wherein the infrared transmission of the next data unit is delayed when a total number of "1" bits in the one data unit exceeds a predetermined value.

13. The method on claim 7, further comprising:

determining a delay factor that depends on a number of consecutive "1's" and a number of consecutive "0's" in the one data unit;

calculating a first delay in accordance with the delay factor;

determining a total number of "1" bits in the one data unit;

when the total number of "1" bits exceeds a predetermined value, generating a second delay; and delaying infrared transmission of the next data unit by one or both the of the first and second delays.

14. A method for transmitting a series of data units using a light transmitter, each data units including a sequence of bits with each bit having a value of "1" or a value of "0", comprising the steps of:

formatting one of the data units for transmission from an LED transmitter;

storing the data unit in a buffer;

selectively calculating a variable delay based on the actual values of bits of the data unit stored in the buffer;

transmitting the data unit in the buffer using the LED transmitter; and delaying transmission of a next data unit in accordance with the calculated variable delay.

15. A data communications system, comprising:

a data generator formatting data bits to be transmitted into a first data unit;

a transmission buffer for storing the first data unit;

a transmitter including a light generator generating light signals in accordance with the data bits in the transmission buffer for reception and detection at a receiver; and a data processor determining a number of bits having a "1" value or a number of bits having a "0" value in the first data unit stored in the transmission buffer and calculating a variable delay period based on the determined number of "1" or "0" bits, wherein after the first data unit is transmitted, the data processor delays transmission of a second data unit by the calculated delay period.

16. The system in claim 15, wherein the delay amount varies depending on the number of bits having a "1" value and the number of bits having a "0" value in the first data unit.

17. The system in claim 15, wherein the delay amount increases when the number of consecutive bits having a "1" value in the first data unit increases and the number of consecutive bits having a "0" value in the first data unit decreases.

18. The system in claim 16, wherein the delay amount is proportional to a difference between a number of consecutive "1" bits and a number of consecutive "0" bits in the first data unit.

19. The system in claim 15, wherein the delay amount is calculated in accordance with the following:

$$N=CT1-CT0$$

where the delay amount is proportional to a correction coefficient N, CT1 is the number of consecutive "1" bits minus 1 in the first data unit, CT0 is the number of consecutive "0" bits minus 1 in the first data unit.

20. The system in claim 15, wherein the transmission of the second data unit is delayed when a total number of "1" bits in the first data unit exceeds a predetermined value.

21. The system in claim 15, wherein the data processor performs the tasks of:

determining a delay factor that depends on a number of consecutive "1's" and a number of consecutive "0's" in the first data unit;

calculating a first delay in accordance with the delay factor;

determining a total number of "1" bits in the first data unit;

when the total number of "1" bits exceeds a predetermined value, generating a second delay; and delaying transmission of the second data unit by one or both the of the first and second delays.

* * * * *